US008559968B2

(12) United States Patent
Frank et al.

(10) Patent No.: US 8,559,968 B2
(45) Date of Patent: Oct. 15, 2013

(54) LOCATION-BASED TARGETING

(75) Inventors: Scott Frank, Dunwoody, GA (US); Robert Starr, Decatur, GA (US); John Ruckart, Atlanta, GA (US); Steven Tischer, Atlanta, GA (US); Samuel Zellner, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 700 days.

(21) Appl. No.: 11/747,602

(22) Filed: May 11, 2007

(65) Prior Publication Data
US 2007/0264968 A1 Nov. 15, 2007

Related U.S. Application Data

(60) Provisional application No. 60/799,762, filed on May 12, 2006.

(51) Int. Cl.
H04W 24/00 (2009.01)
H04M 11/04 (2006.01)

(52) U.S. Cl.
USPC ............. 455/456.1; 455/404.2; 455/456.3

(58) Field of Classification Search
USPC ....... 455/404.2, 421, 440, 405, 412.1–414.4, 455/456.1–457, 418–422.1, 556.2, 517, 455/550.1, 552.1, 553.1, 556.1, 557, 566, 455/4.2; 340/988–996; 342/450–465; 370/52–356; 705/14.1, 14.13, 14.2, 705/14.22, 14.23–14.25, 14.35, 14.38, 14.4, 705/14.41, 14.49–14.69, 26.7; 701/438–440, 424–426, 444, 447, 701/400–412
See application file for complete search history.

(56) References Cited

U.S. PATENT DOCUMENTS

| 5,790,974 | A | 8/1998 | Tognazzini | |
|---|---|---|---|---|
| 6,463,289 | B1 | 10/2002 | Havinis et al. | |
| 6,505,048 | B1 | 1/2003 | Moles et al. | |
| 6,751,626 | B2* | 6/2004 | Brown et al. | 707/101 |
| 7,221,948 | B2 | 5/2007 | Tokkonen | |
| 7,295,132 | B2* | 11/2007 | Steiner | 340/825.49 |
| 8,112,100 | B2 | 2/2012 | Frank et al. | |
| 2001/0049275 | A1 | 12/2001 | Pierry et al. | |
| 2002/0077102 | A1 | 6/2002 | Achuthan et al. | |
| 2002/0111154 | A1* | 8/2002 | Eldering et al. | 455/414 |
| 2002/0111172 | A1* | 8/2002 | DeWolf et al. | 455/456 |
| 2002/0115453 | A1 | 8/2002 | Poulin et al. | |
| 2002/0123928 | A1* | 9/2002 | Eldering et al. | 705/14 |
| 2002/0198004 | A1 | 12/2002 | Heie et al. | |
| 2003/0008672 | A1 | 1/2003 | Fujii | |
| 2003/0054864 | A1 | 3/2003 | Mergler | |
| 2003/0054866 | A1 | 3/2003 | Byers et al. | |

(Continued)

OTHER PUBLICATIONS

Frank; U.S. Appl. No. 11/747,613, filed May 11, 2007.

(Continued)

*Primary Examiner* — Jinsong Hu
*Assistant Examiner* — San Htun
(74) *Attorney, Agent, or Firm* — Woodcock Washburn LLP

(57) ABSTRACT

One embodiment of the present is a method of using location history to optimize communications with perspective customers. Such a method comprises analyzing a user's location history over a period of time; detecting an indication of user interest in sellable items based on at least the location history; and sending a message to the user about a sellable item that is determined to be of interest to the user. Other methods and systems are also provided.

17 Claims, 25 Drawing Sheets

(56) References Cited

U.S. PATENT DOCUMENTS

| | | | |
|---|---|---|---|
| 2003/0088463 A1* | 5/2003 | Kanevsky et al. | 705/14 |
| 2004/0103158 A1 | 5/2004 | Vella et al. | |
| 2004/0137886 A1* | 7/2004 | Ross et al. | 455/414.1 |
| 2004/0140899 A1 | 7/2004 | Bouressa | |
| 2005/0243165 A1 | 11/2005 | Endler et al. | |
| 2006/0174323 A1 | 8/2006 | Brown et al. | |
| 2006/0291640 A1 | 12/2006 | Nagesh et al. | |
| 2007/0226034 A1 | 9/2007 | Khan | |

OTHER PUBLICATIONS

Frank; U.S. Appl. No. 11/747,618, filed May 11, 2007.
Frank; U.S. Appl. No. 11/747,658, filed May 11, 2007.
Frank; Examiner Interview Summary mailed Mar. 31, 2010 for U.S. Appl. No. 11/747,613, filed May 11, 2007.
Frank; Final Office Action mailed May 12, 2010 for U.S. Appl. No. 11/747,613, filed May 11, 2007.
Frank; Non-Final Rejection mailed Nov. 20, 2009 for U.S. Appl. No. 11/747,613, filed May 11, 2007.
Frank; Non-Final Office Action mailed Nov. 24, 2010 U.S. Appl. No. 11/747,613, filed May 11, 2007.
Frank; Final Office Action mailed Dec. 8, 2010 for U.S. Appl. No. 11/747,658, filed May 11, 2007.
Frank; Final Office Action mailed Dec. 8, 2010 for U.S. Appl. No. 11/747,618, filed May 11, 2007.
Frank; Non-Final Office Action mailed Jun. 23, 2010 for U.S. Appl. No. 11/747,618 filed May 11, 2007.
Frank; Non-Final Office Action mailed Jun. 22, 2010 for U.S. Appl. No. 11/747,658, filed May 11, 2007.
Frank; Final Office Action mailed Apr. 28, 2011 for U.S. Appl. No. 11/747,613, filed May 11, 2007.
Frank; Final Office Action mailed May 13, 2011 for U.S. Appl. No. 11/747,658, filed May 13, 2011.
Examiner's Answer mailed Nov. 23, 2011 for U.S. Appl. No. 11/747,613, filed May 11, 2007.
Frank; Final Office Action mailed Apr. 11, 2012 for U.S. Appl. No. 11/747,618, filed May 11, 2007.
Frank; Notice of Allowance mailed Oct. 11, 2011 for U.S. Appl. No. 11/747,658, filed May 11, 2007.
Frank; Non-Final Office Action mailed Oct. 11, 2011 for U.S. Appl. No. 11/747,618, filed May 11, 2007.

* cited by examiner

RINGTONE/THEME ALERT

WELCOME TO PHILIPS ARENA. WE HAVE A NUMBER OF VERY EXCITING RINGTONES AND THEMES FOR YOUR FAVORITE SPORTS TEAMS:

ATLANTA HAWKS
CHICAGO BULLS

THERE IS A CHARGE OF $1 FOR DOWNLOADING A RINGTONE/THEME

PROCEED   CANCEL

FIG. 4

SELECT ENTRIES FROM YOUR ADDRESS BOOK TO BE PART OF A PRIVACY MODE THAT DOES NOT ALLOW FOR DEVICE FEATURES TO BE ADJUSTED BASED ON A CURRENT LOCATION

DAVE ☐
STEVE ☒
KELLY ☐
JESSICA ☒
MELANIE ☐

MORE

CANCEL    OK

FIG. 6

GPS RECEIVER: SELECT WHICH OF THESE ESTABLISHMENTS YOU OPT TO ADOPT DEVICE FEATURES OFFERED BY THE ESTABLISHMENT WHEN A CURRENT LOCATION IS IDENTIFIED TO BE AT OR NEAR THE ESTABLISHMENT

CHURCH ☑
THEATER ☑
COURTHOUSE ☐
CONCERT ☐
SPORTING EVENT ☐

CANCEL    OK    MORE

FIG. 8

RFID READER: SELECT WHICH OF THESE ESTABLISHMENTS YOU OPT TO ADOPT DEVICE FEATURES OFFERED BY THE ESTABLISHMENT

CHURCH ☑
THEATER ☑
COURTHOUSE ☐
CONCERT ☐
SPORTING EVENT ☐

CANCEL    OK    MORE

FIG. 9

MEETING MONITOR

PLEASE SELECT INDIVIDUALS TO MONITOR
ACCESS CODE: 2244

| | | STATUS | |
|---|---|---|---|
| 1. DAN | (555) 111-2222 | ACTIVE | ☐ |
| 2. JEFF | (555) 222-3333 | ACTIVE | ☒ |
| 3. JIM | (555) 333-4444 | ACTIVE | ☒ |
| 4. SCOTT | (555) 444-5555 | ACTIVE | ☒ |

PLEASE SELECT INDIVIDUALS TO MONITOR

MORE  DONE

FIG. 11

TO SELECT THE CURRENT LOCATION AS A VERTEX IN A PERIMETER OF YOUR GEOGRAPHIC ZONE, SELECT "OK"

CANCEL   OK

FIG. 16

TO SELECT THE CURRENT LOCATION AS YOUR PSEUDO-LOCATION, SELECT "OK"

CANCEL    OK

FIG. 20

SELECT ENTRIES FROM YOUR BUDDY LIST TO BE PROVIDED PSEUDO-LOCATION INFORMATION FROM THE SELECTED LOCATION

DAVE ☐
STEVE ☐
KELLY ☑
JESSICA ☐
MELANIE ☑

CANCEL    OK    MORE

FIG. 22

SELECT A POPULAR GEOGRAPHIC ZONE FOR YOUR AREA: 30332

TURNER FIELD

FOX THEATER

PHILIPS ARENA

BOBBY DODD STADIUM

FIG. 24

LOCATION-BASED TARGETING

CROSS-REFERENCE TO RELATED APPLICATION

This application claims priority to U.S. provisional application entitled, "Enhanced Location Services," having Ser. No. 60/799,762, filed May 12, 2006, which is entirely incorporated herein by reference.

This application is related to copending U.S utility patent applications entitled "Location-Based Alerting" filed on the same date as the present application and accorded Ser. No. 11/747,613, which is entirely incorporated herein by reference; "Location-Based Status Checking" filed on the same date as the present application and accorded Ser. No. 11/747,658, which is entirely incorporated herein by reference; and "Privacy Control of Location Information" filed on the same date as the present application and accorded Ser. No. 11/747,618, which is entirely incorporated herein by reference.

COPYRIGHT NOTICE

Not applicable.

STATEMENT REGARDING FEDERALLY SPONSORED RESEARCH OR DEVELOPMENT

Not applicable.

TECHNICAL FIELD

The present disclosure is generally related to wireless communications and, more particularly, is related to location tracking of wireless communications devices.

BACKGROUND

For users of wireless network devices, concerns over privacy are well founded, especially when considering the increasing convergence of wireless communication networks with global computer networks. Wireless networks are now routinely in communication with the global computer network, providing network users with expanded services such as Internet access through their wireless handheld devices. Through this same link, wireless network providers can provide third parties, such as advertising web sites, with the identity and location information that the network provider is (or will be) required to monitor. (As used herein, third party refers to a participant in a transmission other than the wireless handheld device and the wireless network with which the device communicates.) Consequently, third parties would be able to identify a network user and track that user's every movement. Although these third parties may claim that such information merely enables them to profile customers and to present more individualized products or services, a significant portion of network users would agree that such practices are a clear invasion of privacy, ripe for abuse.

Third parties, such as advertisers, may attempt to target users that are sent information from a third party based upon a user's location. Targeting users with information from third parties, such as advertisers, is challenging particularly when the user is active and the information is being sent to a mobile communication device.

SUMMARY

Embodiments of the present disclosure provide systems and methods of using location history to optimize communications with perspective customers. In one embodiment, such a method comprises analyzing a user's location history over a period of time; detecting an indication of user interest in sellable items based on at least the location history; and sending a message to the user about a sellable item that is determined to be of interest to the user.

Other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 is a diagram of one embodiment of a message that may be received on a user's communication device which is used to adjust device features in accordance with the system of FIG. 1.

FIG. 6 is a diagram of a user interface screen provided on a wireless communication device that is used to configure privacy modes in accordance with the method of FIG. 5.

FIGS. 8-9 are diagrams illustrating user interfaces for adjusting device features in accordance with the method of FIG. 7.

FIGS. 11-13 are diagrams illustrating exemplary graphical user interfaces for a monitoring system for use as a meeting monitor according to the method of FIG. 10.

FIGS. 16-19 are diagrams of exemplary interfaces, among others, to a wireless communication device that are used to define a geographic zone in accordance within the system of FIG. 1.

FIG. 20 is a diagram of an exemplary interface, among others, to a wireless communication device that is used to define a pseudo-location in accordance with the system of FIG. 1.

FIG. 22 is a diagram of an exemplary user interface, among others, to a wireless communications device that is used to select individuals as recipients for pseudo-location information in accordance with the system of FIG. 1.

FIG. 24 is a diagram of an exemplary interface, among others, to a wireless communications device which enables a user to select a geographic zone in accordance with the system of FIG. 1.

DETAILED DESCRIPTION

Figure 1:
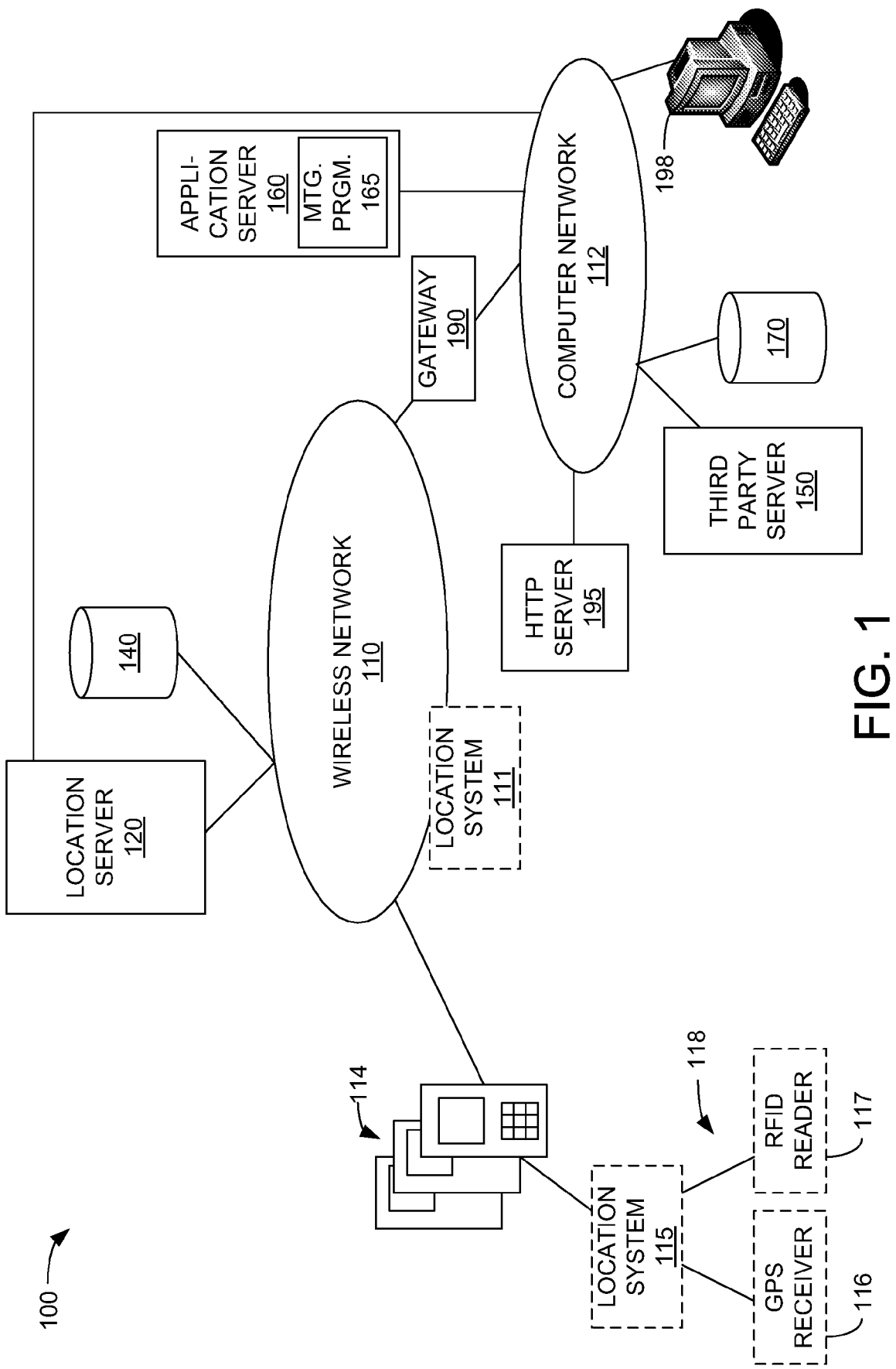
FIG. 1 is a block diagram of system architecture linking a wireless network to a computer network in accordance with the present disclosure.

FIG. 1 illustrates a system architecture 100 linking a wireless network 110 to a computer network 112. As shown, the wireless network 110 is in communication with a plurality of wireless devices 114 through computer network 112. The wireless devices 114 may include any apparatus that can establish a wireless communication session via a wireless communication link. Common examples of the wireless devices 114 include cellular telephones, cellular telephones with text messaging capabilities, personal digital assistants (PDAs) such as the Palm Pilot™, wireless telephones, a computer and interactive text pagers.

FIG. 1 illustrates that a wireless device, such as a cell phone, 114 is in wireless communication with the computer network 112 using, for example, radio channels for voice and/or data communication. It is noted that the term "wireless network," as used herein, is contemplated to include analog or digital cellular mobile networks irrespective of the underlying transmission technology, e.g., CDMA (code division multiple access), TDMA (time division multiple access), WIFI (wireless fidelity), etc. In some non-limiting embodiments the wireless network will be a radio network that employs intersystem messaging (e.g., the IS-41 based messaging scheme) as part of mobile wireless communication, while in other non-limiting embodiments intersystem messaging will not be used. Also, wireless networks further may include wireless data technologies such as but not limited to Aloha, WiFi, WiMax, and BlueTooth, which are capable of wirelessly carrying data in various forms including ethernet frames and/or Internet Protocol (IP) datagrams. The wireless network 110 may include a combination of one or more of, for example, an analog wireless network (e.g., the AMPS (Advanced Mobile Phone System) network), a digital wireless network including cellular networks (e.g., TDMA or CDMA-based wireless networks), a wireless LAN (Local Area Network) such as but not limited to WiFi/IEEE 802.11, a wireless broadband network such as but not limited to WiMax/IEEE 802.16, a WLL (Wireless Local Loop), and a near field wireless technology such as a Bluetooth configuration. A portion of the wireless network 110 may include one or more microwave links for satellite-based communication.

An example of the computer network 112 is the Internet. A location server 120 communicates with the computer network 112. The location server 120 stores location information about a user or a plurality of users of the wireless devices 114 and provides location information to a requesting and authorized user. The location server 120 may receive information that identifies a current location of a user, or the location server 120 may receive information from which, fully or in part, the location server 120 can determine a current location. A third party server 150, in some embodiments, receives location information from the location server 120.

Communication amongst location server 120, third party server 150, and computer network 112 may be via either wireless communication link or wireline communication link, or both. The session may be a voice or a data session, or both. Furthermore, the session may use one of several technologies, including but not limited to analog, digital, fixed bandwidth, variable bandwidth, constant bit rate, packetized data. Voice communication sessions may use one or more of many different CODEC (coder/decoder) standards such as but not limited to μ-law G.711 speech, a-law G.711 speech, G.723, G.729, as well as many other voice encoding technologies that are known by one of skill in the art and are used in analog and digital carriage of POTS/ISDN voice over the PSTN and also used in carriage of VoIP over an IP network.

Whether for monitoring the whereabouts of children as a safety check or for tracking the productivity of employees in a business, tracking and monitoring systems for detecting an individual's location and movement allow one to easily and more effectively supervise others from a remote location.

When the wireless device 114 is in operation, the wireless network 110 tracks the location and identity of the device 114. The plurality of wireless devices 114 provides the wireless network 110 with their identities, typically as mobile identification numbers (MINs) or through other identification (ID) and addressing techniques such as, but not limited to, phone numbers, E.163 and/or E.164 addresses, X.121 addresses, IP addresses, MAC (media access control) addresses, URLs (universal resource locators), email addresses, and/or LDAP (lightweight directory access protocol) or other directory database name labels and tokens. For tracking a location, individual location systems 115 in the wireless devices 114, a network-based location system 111 within wireless network 110, or a combination of both systems 115 and 111 may be used to track a user's location. As an example, a network-based location system may calculate triangulation across cell sites or cell sectors to determine a location of a wireless cellular handset.

Figure 2:
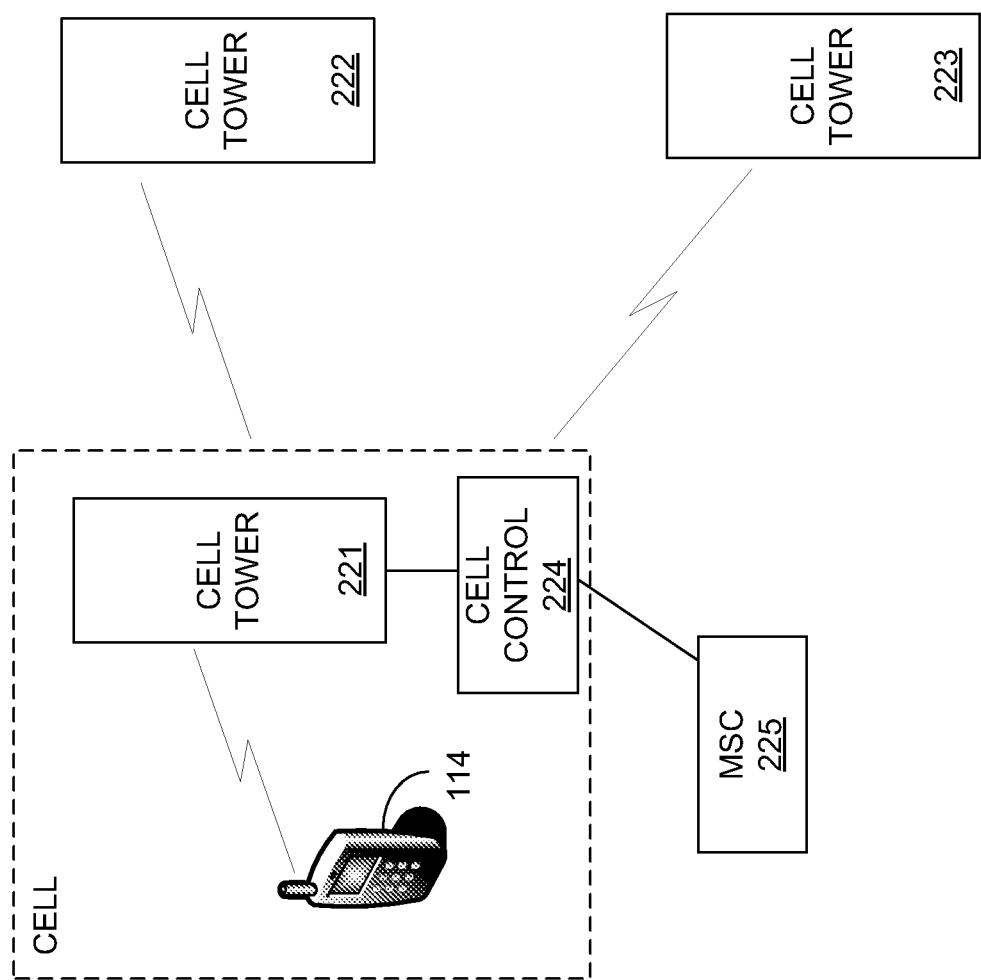
FIG. 2 is a diagram of a wireless communication device located between a series of cellular towers according to an embodiment of the disclosure.

Accordingly, the geographical location for a wireless handheld device, such as the wireless device 114, may be determined according to a variety of methods. Generally, these methods utilize control signals that are emitted and received by the wireless devices 114. As shown in FIG. 2, mobile cellular telephone 114 is located near cell towers 221, 222, and 223, and is closest to the cell tower 221. The cell towers 221, 222, and 223 may be spaced one to five miles from each other, depending upon the amount of cellular use in a given area. In FIG. 2, each of the cell towers 221, 222, and 223 receives control signals from cellular telephone 114. For cell tower 221, this information is sent to a mobile switching center (MSC) 225 through cell control 224. Cell tower 221 also broadcasts control signals sent from the MSC 225, which are then received by wireless devices 114. The control signals are used for registering that the wireless device 114 is operating within a cell, so that the wireless network 110 can establish a communications link between the cell tower and the device 114.

One method for determining the geographical location is to identify the cell tower, such as the cell tower 221 that is physically within the closest proximity to the device 114.

(Also, the closest WIFi, WiMax, and/or Bluetooth access point may be determined using similar techniques, and triangulation techniques can be further employed to more accurately determine location using multiple WIFi, WiMax, and/or Bluetooth access points.) By determining which of the cell towers 221, 222, or 223 is closest to the mobile cellular telephone 114 and providing this information along with a mapped display on the Internet, an authorized user can find a cellular telephone user's location within a range of approximately three miles. This can be performed by forwarding "registration" information that is temporarily stored within the MSC 225 to the network-based location system 111 in FIG. 1. Another technique for identifying the cell tower, such as the cell tower 221, closest to the wireless device 114 is to use a "mobile maintenance command signal." The mobile maintenance command sends out a paging request signal to be received by the mobile telephone 114. The mobile maintenance command is sent to all cell sites in the system, or can be sent to the last known cell site based on registration over the paging channel. The mobile 114 is then paged (called) with a modified signal that tells the mobile phone 114 to respond, but does not alert (ring). The mobile phone 114 then responds back. Every cell nearby will receive the mobile's signal and forward the response to the network-based location system 111. Based on RSSI (received signal strength indication), the mobile phone 114 is determined to be closest to a particular site in the system.

The geographical location of the wireless device 114 can be determined with greater detail by using cell tower triangulation. In this method, the network-based location system 111 determines the location of the wireless device 114 by comparing the signal strength of the control signals emitted by the wireless device 114 received at antennae at several neighboring cell towers 221, 222, 223. The signal strength is strongest at the nearest cell tower 221. A diminished signal is received at other cell towers 222, 223 in the vicinity. The differences in signal strength can be used to calculate the location of the wireless device 114, at least within 200 meters. Cell tower triangulation algorithms are presently being used and refined for E911 emergency services.

An example of the individual location system 115 would be a Global Positioning System (GPS). Some wireless devices 114 currently incorporate a GPS receiver 116, such as GPS receiver chips, to receive location information by satellite. By connecting the GPS receiver 116 in the wireless device 114 to the communication equipment within the wireless device, the GPS geographical information can be forwarded to the location server 120 for access by an authorized user.

Cellular telephones, interactive pagers, and personal digital assistants each have a liquid crystal display (LCD) that can be used with the monitoring system of the present disclosure to notify the individual that they are being monitored. Many wireless communications devices, such as the devices 114, include a text messaging feature to allow the users to receive e-mail messages or any other type of short text messages on the LCD display.

To track the location of wireless device 114, the system architecture 100 can include one or both of network-based location system 111 and device-based location system 115. Network-based location system 111 may be a component of wireless communication network 110. Device-based location system 115 may be an integrated part of the wireless device 114. One or both of network-based location system 111 and device-based location system 115 can generate location information pinpointing the location of the wireless device 114. In some embodiments, both location systems 111 and 115 are compatible with the Geographic Information System (GIS) and the GPS. The device-based location system 115 may be the GPS receiver 116 that is in wireless communication with a constellation of GPS satellites. In some embodiments, both location systems 111 and 115 can be used to provide redundancy, accuracy, and reliability. The location information may comprise point coordinates pinpointing the location of wireless device 114. The point coordinates can include an X component and a Y component of a coordinate system. According to exemplary embodiments, the location information comprises a longitude and a latitude. For increased accuracy and granularity, the location information can further comprise an altitude. In some embodiments, the location information can pinpoint the location of the wireless device 114 to within 125 meters, as required by the E911 mandate.

In some embodiments, location server 120 is compatible to one or more of GIS (Geographic Information System), GPS (Global Positioning System), and WAP (Wireless Application Protocol). The location server 120 can receive the location information from one or both of the location systems 111 and 115. The location server 120 can also receive identity information of wireless device 114. The identity information may comprise, for example, a serial number of the wireless device 114. As previously mentioned, the identity information may also be a MIN of the wireless device 114. The location server 120 may be a network-based component, as shown in FIG. 1. In other embodiments, the location server 120 may be a portable unit that is part of the wireless device 114. Therefore, the wireless device 114 may comprise none, one, or both of the location server 120 and the location system 115.

As discussed above, in some embodiments, among others, the location server 120 and location systems 111 and 115 can be WAP compatible. WAP is an application environment and set of communication protocols for wireless devices designed to enable manufacturer-, vendor-, and technology-independent access to the computer network 112 and advanced wireless telephony services provided by the wireless communication network 110.

WAP provides wireless Internet access through digital cellular networks, giving network users a menu driven method for downloading information, such as flight schedules and bank account balances, to wireless devices, such as the wireless devices 114, from the computer network 112, such as the Internet. WAP is described in WAP version 1.1, which is herein incorporated by reference in its entirety.

As part of determining the location information, the location server 120 processes the control signal information emitted and received by the wireless device 114. The type and amount of formatting necessary depends upon both the method utilized for determining the geographical location of the wireless device 114 and the type of information to be supplied to the authorized user. As an example, if the location is determined solely according to the identity of the closest cell tower, such as the cell tower 221, the network-based location system 111 is forwarded a code identifying the cell tower. The code is then translated through a look-up table into a geographical address, which may include information such as a street name, street intersection, county, or township. If the location is determined by the triangulation method, the calculated data is converted into geocoded location coordinates that are compatible with standard mapping software. If GPS information is communicated from the wireless device 114, the network-based location system 111 merely decodes the communications signal and passes the information along to a location database 140 which stores location information.

In one embodiment, an implementation of the system of FIG. 1 involves the location information for a user being tracked by a third party and based on the user's tracked location information, the third party sends information to the user that is determined to be of interest to the user. It is noted that targeting users with information from third parties, such as advertisers, is challenging particularly when the user is active and the information is being sent to a mobile communication device, such as the wireless device 114. The aforementioned implementation addresses these concerns.

Accordingly, a location of the user associated with the wireless device 114 is provided to the location server 120 from location system 111, 115. In one embodiment, the location system 115 within the wireless device 114 provides a current location to the location server 120. A variety of ways may be used to acquire location information. For example, as discussed above, the GPS receiver 116 that is part of the wireless device 114 may acquire GPS coordinates and provide these coordinates to the location server 120. The location server 120 may then allow a third party to access the user's location information. In this example, the third party server 150 receives location information about a user from the location server 120.

The third party server 150 may be GIS, GPS, and WAP compatible. In some embodiments, the third party server 150 can receive the location information from the location systems 111 and 115. The third party server 150 can also receive identity information of the wireless device 114. The identity information may comprise, for example, a serial number of the wireless device 114. The identity information may also be a mobile identification number of the wireless telephone 114 or other forms of identifying information such as but not limited to phone number, customer number, a person's name, an email address, etc.

Using the location information and the identity information of the wireless device 114, the third party server 150 can be adapted to execute a large number of actions according to operating rules, instructions, or preferences provided by a user of the device 114. For example, in an embodiment involving wireless telephony in which the wireless device 114 is a wireless telephone, the third party server 150 could use the location information and the identity information to request that the user download a ringtone corresponding to a user's current location and/or customize the user's wireless device 114 to match an event occurring at the user's current location.

Alternatively, or in combination with, the location system 115 in the wireless device 114, the wireless device may include an RFID reader 117 that detects the presence of a nearby RFID tag, such as an RFID tag on the electronics section of a department store. The RFID reader 117 communicates with the RFID tag and receives an identifier for the tag and an address for communicating with the third party server 150. The location system 115 transmits the RFID identifier to the third party server 150 (or a gateway 190 of third party server 150). Additional information may be transmitted such as an indication that the third-party server 150 is or is not accessible over a WiFi network within the department store. A WiFi, WiMax, or Bluetooth network within a store or a mall may have multiple WiFi, WiMax, or BlueTooth access points to ensure adequate coverage of the area, and the closest WiFi, WiMax, or Bluetooth access point to a customer may be determined to provide additional information about a customer's location. Via this type of location tracking, a specific position of the wireless device 114 may be pinpointed within a small area, such as a particular section or aisle of a store. Also, in some embodiments, an RFID tag may be positioned on the user's wireless device 114 and the reader 117 positioned in a particular location, so that when the reader detects the wireless device 114, the reader can relay to the third party server 150 that the wireless device 114 is in the area.

The third party server 150 may communicate with the location database 140 and other databases, such as a third party database 170, to determine interests of the user. For example, the amount of time that the user has visited the current location may be provided to the third party server 150 from the third party database 170. Further, the past customer purchases of the user of the type offered in the visited area may be provided to the third-party server 150. Accordingly, the current location information is also stored in the location database 140 by the location server 120 for future use, according to exemplary embodiments. By tracking movement of the user, a potential interest of the user based on the user's commonality in time in searching for specific types of goods and services may be attempted to be determined by the third party server 150. In some embodiments, instead of the location database 140 being stored on the computer network 110, the location database 140 may be maintained internally by the wireless device 114.

The third party server 150 can receive a user's location information and forward location-dependent messages. As an example, the third party server 150 of a content provider could provide alerts or content (e.g., advertisements) to the wireless device 114 when the device moves into a targeted area (e.g., a particular area within a store of a shopping mall, including a particular aisle as opposed to the adjacent aisle).

In some embodiments, additional data can be used to determine a potential user or customer's interest in goods or services offered in a current location. For example, the characteristics of the tracked locations and movement of the user may be compared against monitored locations and movement of previous users and their resulting actions (e.g., whether those types of movements resulted in purchases of goods and of what type). Accordingly, content may be sent to the wireless device 114 from the third party server 150 to facilitate transactions which are determined to be of potential interest to the user. According to exemplary embodiments, an indication of interest in a particular good or service is a function of historical data such as types of items for sale at locations, frequency of visits to location types, duration of visits or individual visit over a period of time, items or services purchased, demographics of user, user profile, complementary and substitute items purchased, etc. This information may be stored as part of the third party database 170. Alternatively, in some embodiments, a user database at the wireless device 114 may maintain historical data.

Therefore, the indication of user interest may be qualified based on time spent in a first area of a locale, such as a store, a mall, amusement park, sports arena, etc. Accordingly, the first area may be a store, building, shopping mall, store aisle, vehicle, geographic boundary, etc. The indication of user interest may be further qualified based on time spent in a second area of the locale. For example, if a user spends twice as much time in a second area of a locale as a first area, it may be assumed that the user was more interested in the second area than the first area. The indication of user interest may further be qualified based on demographics, activities observed in the first area, etc. Such activities may include purchases, inquiries, demos, returns, customer browsing, selection, and showing interest. Based on the determined indication of user interest, an advertisement may or may not be sent to a user by the third party server 150. The advertisement may be one of a coupon or directions to potential items of interest. In one embodiment, the advertisement is delivered to a portable communications device for the user which may or may not be the wireless device 114. Historical data may include acquired information from multiple locations of a store or similar establishment (e.g., restaurant, park, etc.), specific locations in a store or similar establishment, a time period beyond one day, etc.

As an example, one embodiment of a third party monitoring system (which utilizes components of FIG. 1 such as location server 120, location database 140, third party server 150, third party database 170, and wireless device 114) may track a person's movements throughout the day and record location information indicating that the user has been to five different car dealerships. The third party monitoring system derives from the user's habits that these trips to the dealership were unusual and thus determine the user was clearly interested in a car. For example, the third party monitoring system accesses the user profile from the third party or store database 170 to determine preferences and, from the store database 170, checks the date of the last car purchase by the user. From this information, the third party monitoring system pushes an advertisement of a new family car with directions to the nearest FORD dealer (could be any auto dealer). Therefore, the third party monitoring system selects an action (e.g., sending advertisement and/or directions) to perform based on the user's predicted interest.

In another example, an embodiment of a third party monitoring system performs tracking by obtaining a list of establishments the user has visited (from the third party database 170) as opposed to location coordinates. This may provide more privacy for the user since the third party monitoring system would not share visits to residential locations or other locations designated by the user as private. In this scenario, the third party monitoring system might ascertain that the user visited a travel agent and the Mexican tourist office and conclude the user is planning a trip to Mexico. Based on this prediction, the user might receive information coupons, hotel information, and other related travel related information to his or her wireless device 114 or some other communications device associated with him or her from the third party server 150.

In another scenario, the third party monitoring system could also provide information regarding a child or spouse's activities. For example, the third party monitoring system might notify the parent that the child appears to be shopping based on locations that the child is visiting that are received by the third party server 150 from the location server 120, according to the child's visits to various locations. Note the system might differentiate visited location verses passed locations by time spent in the location or provide greater weighting based on time spent in a location.

In a store, an embodiment of a third party monitoring system could track a user's movement and determine the user's shopping needs/interests. For example, the user could go into a sports store and look at fishing boats for a period of time. After which, location information is provided to third party server 150 from the location server 120. The third party server 150, based on the received information, might then suggest, by sending the user a text message to the wireless device 114 of the user that the user look at the sale on fishing rods at the back of the store. The message might include directions or a coupon or a video.

Figure 3:
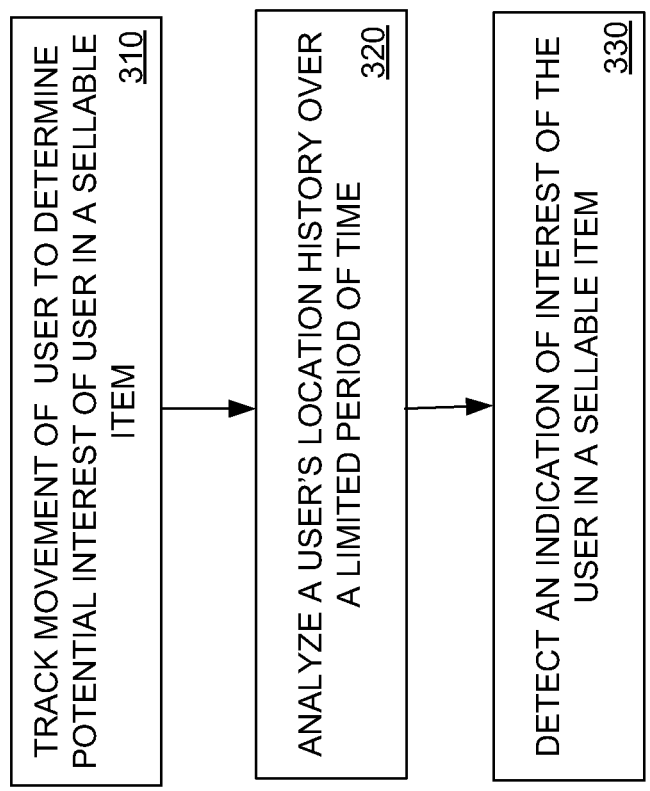
FIG. 3 is a flowchart diagram of one embodiment, among others, of a method of using location history to optimize communications with perspective customers in accordance with the system of FIG. 1.

Accordingly, a method of using location history to optimize communications with perspective customers, as illustrated in FIG. 3, may include tracking (310) movement of a user (using one or more of the location server 120, wireless device 114, and the third party server 150) to determine potential interest of a user based on user's commonality in time in searching for specific types of goods and services. The method further comprises analyzing (320) a user's location history over a limited period of time (by the third party server 150) and detecting (330) (by the third party server) an indication of user interest in sellable items, as further represented in the flowchart of FIG. 3.

In one embodiment, a third party monitoring system can determine that a person has gone into one particular store (e.g., a consumer electronics retailer) within the last few hours. Based on that information, another store of the same type (e.g., a consumer electronics retailer) could send an alert or coupon to the customer based on a inference of determining that the customer is likely shopping for some type of consumer electronics. The temporal locality (or commonality in time) of a customer visiting similar kinds of stores within a reasonable period of time may be an indication that a customer is shopping for a particular kind or type of good or service.

Similarly, a customer within a store who spends a relatively significant amount of time on a single aisle in the store or in front of a single display is likely looking to purchase something on that aisle or in the display. For example, a person that spends five minutes in front of the hot dog freezer in a grocery store may be a good potential customer to offer a coupon or other incentive to buy complementary goods (such hot dog buns, mustard, ketchup, relish, potato chips, etc.) and substitutes (such as hamburgers, sausage, etc.). Unlike ads/coupons at the time of purchase, sending ads/coupons to a customer's mobile device 114 based on the behavior of a customer in the store allows the ads/coupons to reach the customer before he/she has gotten into the check-out line.

According to exemplary embodiments, a location sensor 118, such as the GPS receiver 116 or RFID reader 117, in the wireless device 114, collects location information and relays the location information to the location database 140 (e.g., via location system 111, 115). The location sensor 118 and location database 140 may be in a network or in a mobile device, such as the wireless device 114. In particular, the location sensor 118 and the database 140 may be in a network location remote from the wireless device 114 of a user. In another embodiment, the location sensor 118 and database 140 may be part of the wireless device 114 of a user. The location database 140 contains data, such as a history of locations visited by the user.

Additional data may be stored that is used to determine potential consumer interest in a good or service offered by a store visited by a user. This additional data may be stored at a user database in the wireless device 114 and/or stored at the third party database 170. This information is used to predict a user's interest in a good or service by the third party server 150. For example, an indication of interest may be a function of: type of items for sale at location, frequency of visits to location types, duration of visits or individual visit over a period of time, items or services purchased, demographics of user, user profile, complementary and substitute items purchased, demos, inquiries, returned items, etc. Also, the third party server 150 could associate group activities and the behavior of group members with the user, such as family members, company employees, church groups, etc. Statistical analysis/modeling techniques may be used by the third party server 150, such as, regression analysis, Bayesian analysis, trend analysis, forecasting, etc.

Such a third party monitoring system may be implemented in the third party server 150 or in an application on user device 114. Location information may be combined with recent or prospective sales information (from universal product code (UPC), cash register, RFID, etc.) which allows add-on sales opportunities for advertising while in the store or when a customer leaves or enters the location of a store. The location information provides improved e-commerce opportunities for stores and also allows better advertising that is more accurately targeted to consumers who are more likely to purchase a particular produce or service. The targeted ads may include structured content comprising one or more of the following images, video, audio, text, multimedia, etc. Personalized location information for store customers (or other automatic identification means such as facial recognition) allows a store to immediately recognize that a preferred or high-volume customer has entered the store so that sales representatives can offer excellent service to the big spending customer.

In some embodiments, other types of information may be sent to a user based on the user's location. To make cell phones 114 and other communication devices more user friendly, an alert function may be defined by some other party besides the end user and tied to a particular location. Therefore, unique alert functions may be associated with specific locations.

As an example, when a user enters a basketball arena his or her communications device 114 may receive a request to load a customized ringtone/theme from a third-party server 150 based on one of the teams playing in the basketball game. FIG. 4 shows such a message that may be received on a user's wireless device 114. In the message, it invites a user to download a ringtone for one or both of the teams competing in that day's basketball game. The message also indicates that a monetary charge is made for downloading a ringtone.

Ringtone data and theme data generally are files which affect the operation and appearance of the communication device 114 during operations. A ringtone can include video, image, and music depending on phone capabilities. A theme may be a combination of altering tone and desktop image(s), menu style, key style, device sounds (such as when typing or sending an email). Accordingly, desktop background, window appearance, operating system functions, in one embodiment, are all affected when a new theme is implemented.

Depending on the setting to the communications device 114, the device might block these messages, alert the user of the new options, or automatically select and install the recommend ringtone/theme. Upon leaving the stadium, the phone 114 reverts back to its default ringtone, in some embodiments.

In another example, when a user enters a specific location, for example a Tower Record store, the store or the service provider could use the third party server 150 to push to the user's communications device 114 a new set of alerting tones or themes which a user could select from a menu list. There might be a fee associated with acquiring one of these ringtones/themes.

In one embodiment, the third-party server ("ringtone/theme server") 150 uses rules to select one or more ringtones/themes to present to the remote communications device 114. The server 150 uses the location of the communications device 114 along with user profile information (from the third party database 170) and device capabilities, when available, to determine what, if any, ringtone/themes the server could communicate to the communications device 114.

In some embodiments, the gateway 190 provides the transformation and interface to the remote communications device 114 and the server 150. According to exemplary embodiments, the gateway 190 handles the various configuration sub-systems for cell phone alerting control systems of multiple service providers. In some embodiments, the gateway 190 is not required, or the gateway's functionality is incorporated into the third party server 150.

According to exemplary embodiments, the location server 120 provides the location information regarding the remote communication device 114. The location information can be provided through the network location system 111 or the device based location system 115, such as, GPS, as discussed above.

Figure 5:
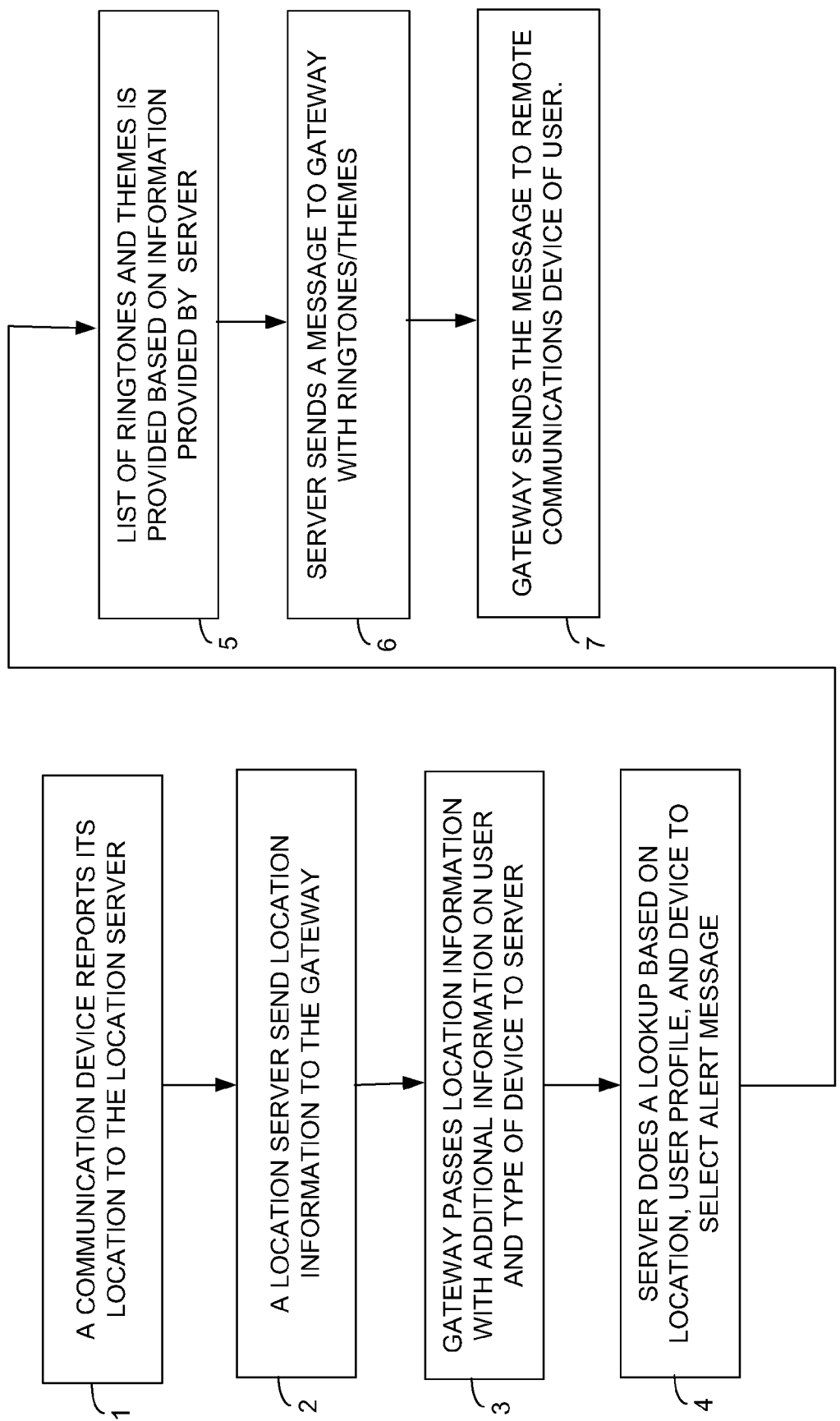
FIG. 5 is a flowchart diagram of one embodiment, among others, of a location tracking method in accordance with the system of FIG. 1.

In one embodiment, a location tracking method would work as follows, as depicted in FIG. 5: (1) the communication device 114 reports its location to the location server 120; (2) the location server 120 sends location information to the gateway 190; (3) the gateway 190 passes location information with additional information on the user and type of the device 114 to the R/T (ringtone/theme) server 150; (4) the R/T server 150 does a lookup in the R/T database 170 based on location, user profile and device to select alert message; (5) the R/T database 170 provides list of ringtones and themes based on information provided by the R/T server 150; (6) the R/T server 150 sends a message to the gateway 190 with ringtones/themes from the database 170; and (7) the gateway 190 sends the message to the remote communications device 114.

Depending on the configuration of the remote communications device 114, the device can alert a user to available ringtones/themes or could automatically implement recommended ringtone/theme.

Additional device or service features may also be adjusted by a third party or by the wireless device upon the wireless device or the network determining that a geographic boundary threshold has been crossed. Device and/or service features that may be adjusted include but are not limited to information such as alerting ring tone, buzzer, vibration, video, flashing lights, text message, altering audio channel (such as but not limited to speaker or ear phone) based on the location of the called party and/or the location of the calling party. Furthermore, these services and/or features can be stored locally on the mobile device, stored in the wireless network, or stored in a combination of the mobile device and the wireless network. For instance, calls from a person at college stadium on game day could have a pushed ring tone of the college team fight song. Calls to a teenager at school could play the latest rap song when at school and play a standard ring tone when at home. In this way, a teenager's ring tone may be changed from the latest music with lyrics that might offend parents to more mellow music whenever the teenager is at home. A person's ring tone may change from a professional non-descriptive ring to more personality defining movie lyrics whenever the person leaves the office. Calls to a person in a movie theater can be automatically muted and switched from audio to another mode such as vibration. Prioritized, urgent, and emergency calls may not have the alerting signal changed, when regular or standard calls may yield control of the alerting type to the movie theater to automatically switch the standard or regular alerts for all phones in a theater to vibrate. A remote cell phone, such as the wireless device 114, could compare its known current location against a database of geographic zones for various business types to determine that the phone has entered a movie theater. Then, the alerting type could be automatically changed to vibration from an audible ring. Remote devices could allow a public mode that allows movie theaters, libraries, schools, etc. to adjust the alerting mechanism for non-priority calls (such as from friends) as opposed to family emergencies.

Priority levels could control for which calls the third party would be allowed to change the alerting signals when a person enters the geographic zone of the third party (such as a school, library, theater, etc.). A public mode may be managed using a security code for authentication. In one embodiment, user interface screens provided on the wireless device 114 may allow a user to select individuals from the user's "buddy" or contact list as having a privacy mode that does not allow for device features to be adjusted when communication is commencing with these individuals, as reflected in FIG. 6.

Alerting tones can change based on location, and the changes can include more options than just mute, vibrate, and audible sound. Tone changes based on location can be changed from one audible tune to another audible tune or from a tune at a high volume level to the same tune at a low volume level. As previously discussed, the portable electronic device 114 is capable of knowing its location through GPS, wireless network information such as beacon transmitted identifications, and/or near field wireless communications, according to exemplary embodiments.

Figure 7:
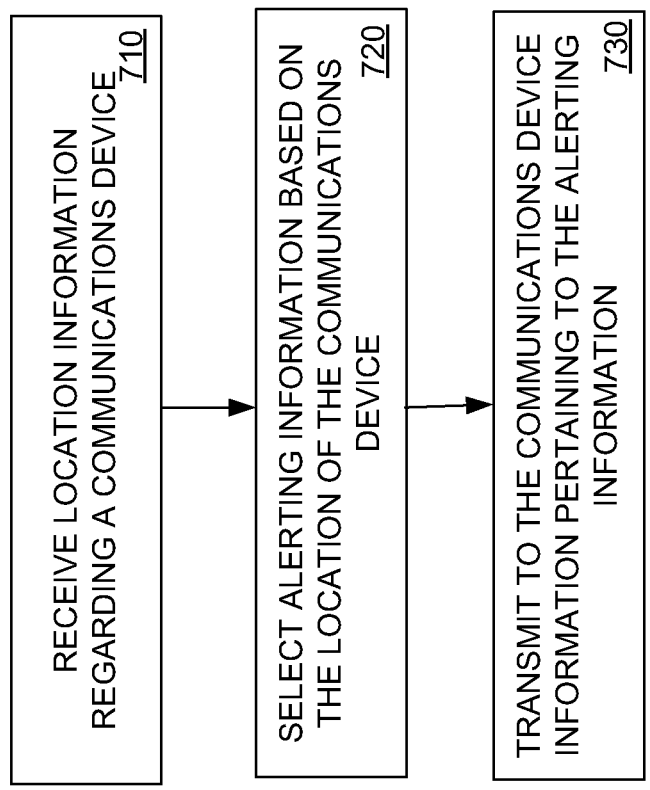
FIG. 7 is a flowchart diagram of one embodiment, among others, of a method of using location information to push alerting information to a communications device in accordance with the system of FIG. 1.

In one embodiment, a method of using location information to push alerting information to the communications device 114 comprises receiving (710) location information regarding the communications device 114 (at the third party server 150); selecting (720) alerting information based on the location of the communications device 114 (by the third party server 150); and transmitting (730) to the communications device 114 information pertaining to the alerting information (by the third party server 150), as depicted in the flowchart of FIG. 7. In some embodiments, the information that is transmitted may be dependent on the operating rules of the communications device 114 or user. Further, a third party transmitting the alerting information may be authenticated before acceptance of any information. The types of transmitted may include sound, music, alert tone, video, image, or a theme. Further, transmitted information may change the alerting setting in the communications device 114 to a new nonsilent setting.

Operating rules, instructions, or preferences may be specified by the user or created by the third party server 150. The operating rules may be provided to the third party server 150 via a number of channels. For example, the operating rules may be keyed in by the user or other persons using a keypad on the wireless device 114. Alternatively, the operating rules may be provided via wireless communications network 110 and/or computer network 112. Operating rules may stipulate that features involving a phone call from a user's parents should not be affected.

FIGS. 8-9 show exemplary interfaces from the wireless device 114 that are used to select locations where device features may be adjusted, in one embodiment. In the illustration of FIG. 8, an interface is provided for a system utilizing the GPS receiver 116 as the location sensor 118. The user checks the boxes next to locations where the user opts to let features be adjusted when the user visits a location of the selected type. Similarly, FIG. 9 illustrates the same interface that is used in a system utilizing the RFID reader 117 as the location sensor 118.

Wireless network providers can provide third parties, such as advertising web sites, with the identity and location information that the network provider is (or will be) required to monitor. Further, wireless networks 110 can provide location information to scheduling applications and/or other software applications. For example, based on a person's current location and planned itinerary of business meetings, plane reservations, dinner reservations, etc., a software application using the information may infer that a user is not likely to make a scheduled appointment and either automatically reschedule the appointment or notify the user to determine whether the user wants to reschedule the appointment by bringing up a voice, video, data, or web page connection into the appointment reservation system to allow the user to pick a new time.

As another example, if a parent could set a curfew time for a teenager, a third party monitoring system could notify the parent if the teenager will not make it home on time or the system could notify the teenager when he/she must leave for home (based on distance from home as well as expected traffic delays and travel time) in order for the teenager to make the curfew. Similar notifications could be used to tell a person when to leave for a plane, office meeting, or other appointment.

Additional examples include automatically changing a ring tone/alerting sound automatically based on at least location information and possibly other factors such as time of day, day of week, etc. The alerting form can be other characteristics instead of or in addition to sound such as but not limited to visual indicators, vibrations, etc. that may flash or vibrate differently or in particular sequences based on location information.

Furthermore, the control of alerting sounds and other indicators (such as flashing and/or vibration) can be passed to a third party. The security control that authorizes a third party, such as but not limited to a church, a school, and a movie theater, to change alerting types, alerting signal amplitude levels, and alerting information signals can be based on an identifier for the church, school, movie theater, etc. plus a location range in which security is relaxed to allow the church, school, movie theater, etc. to change a cell phone or other portable electronic device from ring to vibrate. Outside of that geographic zone, the identifier for the church, movie theater, etc. would not have the authority to change a mobile device's alerting type, according to exemplary embodiments.

Also, the relaxation of a mobile device's security within a geographic area (such as a movie theater) may allow a mobile device to be switched from ring to vibrate based on any command to change modes from ring to vibrate that is received by the mobile device without requiring identifying information from the transmitter of the muting/vibrating command request. Based on a message from wireless equipment at the movie theater or church, the mobile device can use a learning mode to initially prompt a user by asking whether to allow the movie theater or church to have security access to change the alerting type for the mobile device. In addition to a location-based constraint on the security relaxation (as well as potentially an identifier-based constraint), the security rules may have an expiration time of two and half hours at the movie theater or an allowable control time window of one hour every week during church services.

Each business or entity (such as but not limited to: movie theaters, libraries, schools, churches, etc.) could have a different authentication identifier (ID). In a non-limiting embodiment, the wireless device may only allow the movie theater authentication ID to change the alerting settings of the wireless device when the wireless device is in the geographic location of the movie theater. As an example, when the movie theater authentication ID first asks for permission to change the alerting settings on the wireless device, the movie theater request message may include coordinates of the vertices of a polygon circumscribing the movie theater or the coordinates of a center plus a radius describing a circle containing the movie theater. The wireless device can compute the approximate area size over which the movie theater is requesting to control the wireless device's alerting settings to then inform the user of the wireless device with a reasonable estimate of the location range over which the user is surrendering security control of the alerting settings of the wireless device to the movie theater's authentication ID, which would be contained in the request message sent from the movie theater to the wireless device.

Further, in one embodiment, the wireless device 114 may receive transmissions identifying the current location, such as transmissions from an RFID tag or a WiFi beacon. Accordingly, based upon the received information, the wireless device 114 may ascertain the type of location being visited (e.g., a church) and then correspond by changing device settings in response to recognition of the new location.

Figure 10:
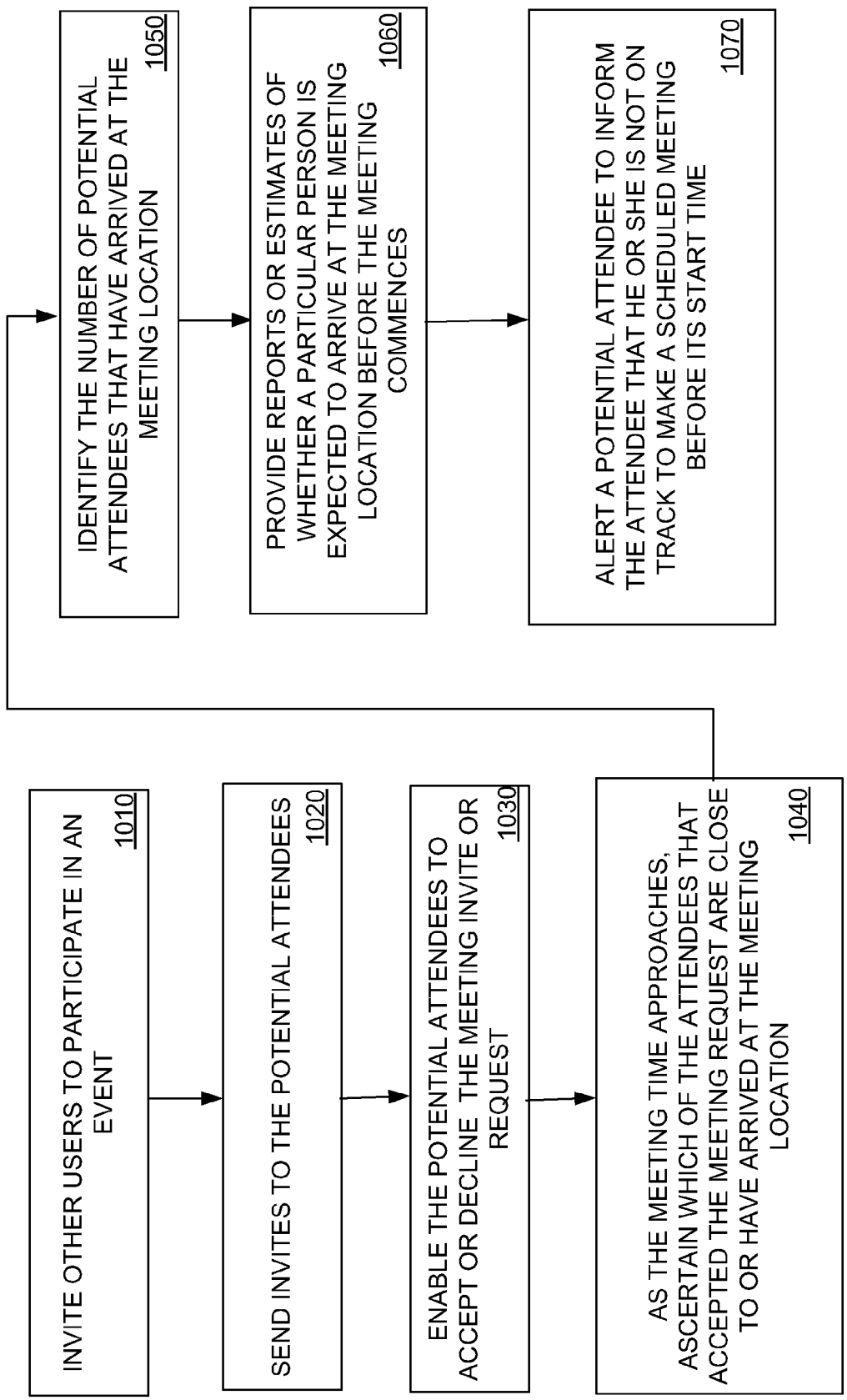
FIG. 10 is a flowchart diagram depicting one embodiment, among others, of location-based updating of a status of an event.

In one embodiment, location information may be provided to the third party server 150 so that an application can track and update the status of events associated with a plurality of users, as illustrated in the flowchart of FIG. 10. For example, in one embodiment, a meeting program 165 hosted or embedded on third party server 150 or application server 160 enables a user to invite (1010) other users ("potential attendees") to participate in an event, such as a scheduled meeting. Invites are sent (1020) by the meeting program to the potential attendees. Via the meeting program, the potential attendees may accept or decline (1030) the meeting invite or request. The meeting program can inform the user that made the request with the status of the meeting, such as who accepted or declined the meeting request. Additional information may also be tracked however. For example, each of the potential attendees may have a tracking device, such as GPS equipped phone 114 that is identified in the third party database 150. The meeting program may access the third party database 170 to receive the identification number for a potential attendee's tracking device, such as the wireless device 114, and request the attendee's current location from the location database 140. Therefore, as the meeting time approaches, the meeting program can ascertain (1040) which of the attendees that accepted the meeting request are close to or have arrived at the meeting location which is known to the meeting program. Further, the meeting program can identify (1050) the number of potential attendees that have arrived at the meeting location. The meeting program can provide (1060) reports or estimates of whether a particular person is expected to arrive at the meeting location before the meeting commences. Accordingly, the meeting program can also alert (1070) a potential attendee to inform the attendee that he or she is not on track to make a scheduled meeting before the meeting's start time so that the user can make attempts towards progressing to the meeting location, if he or she is not on his or her way.

Figure 12:
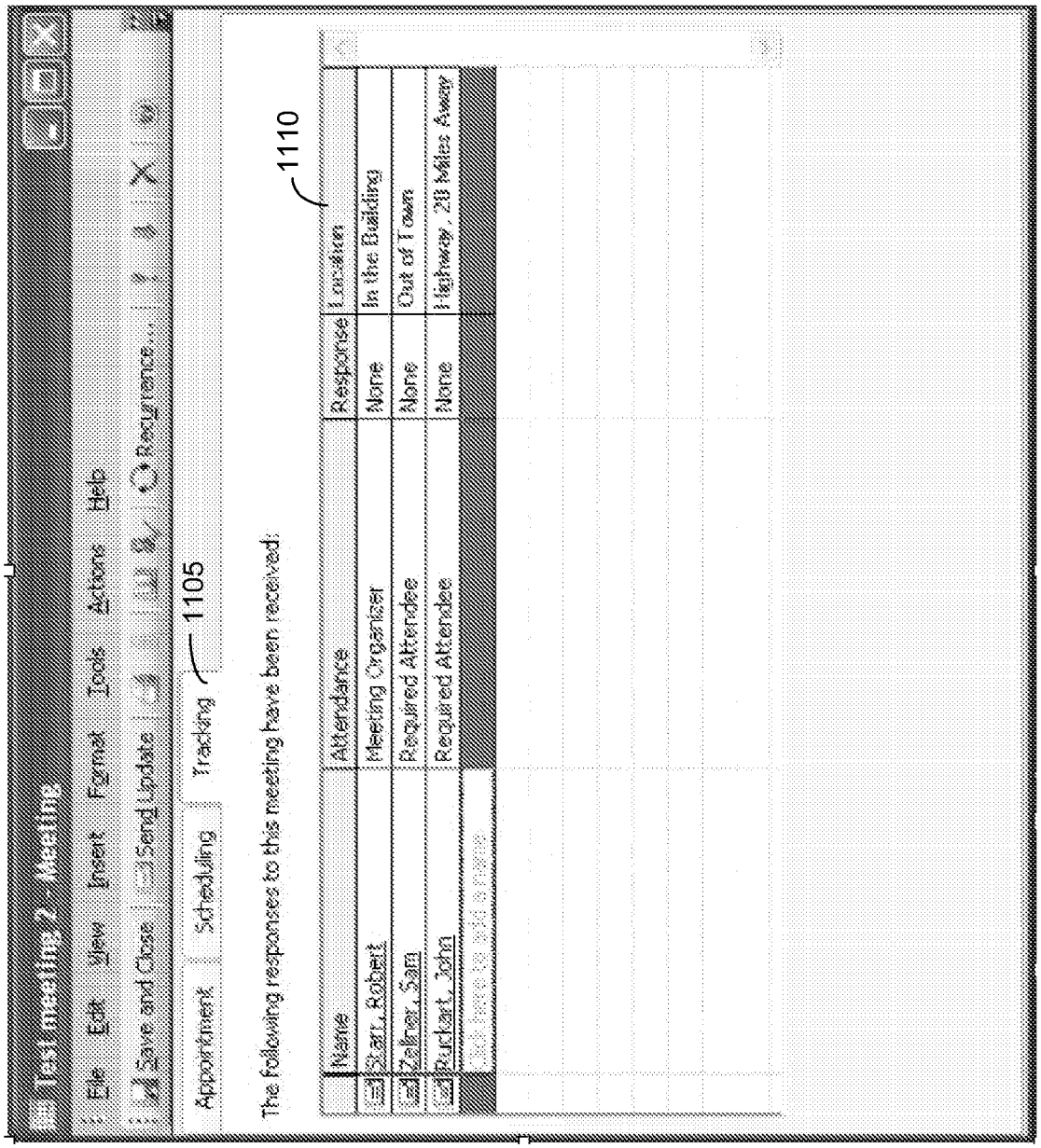
Figure 13:
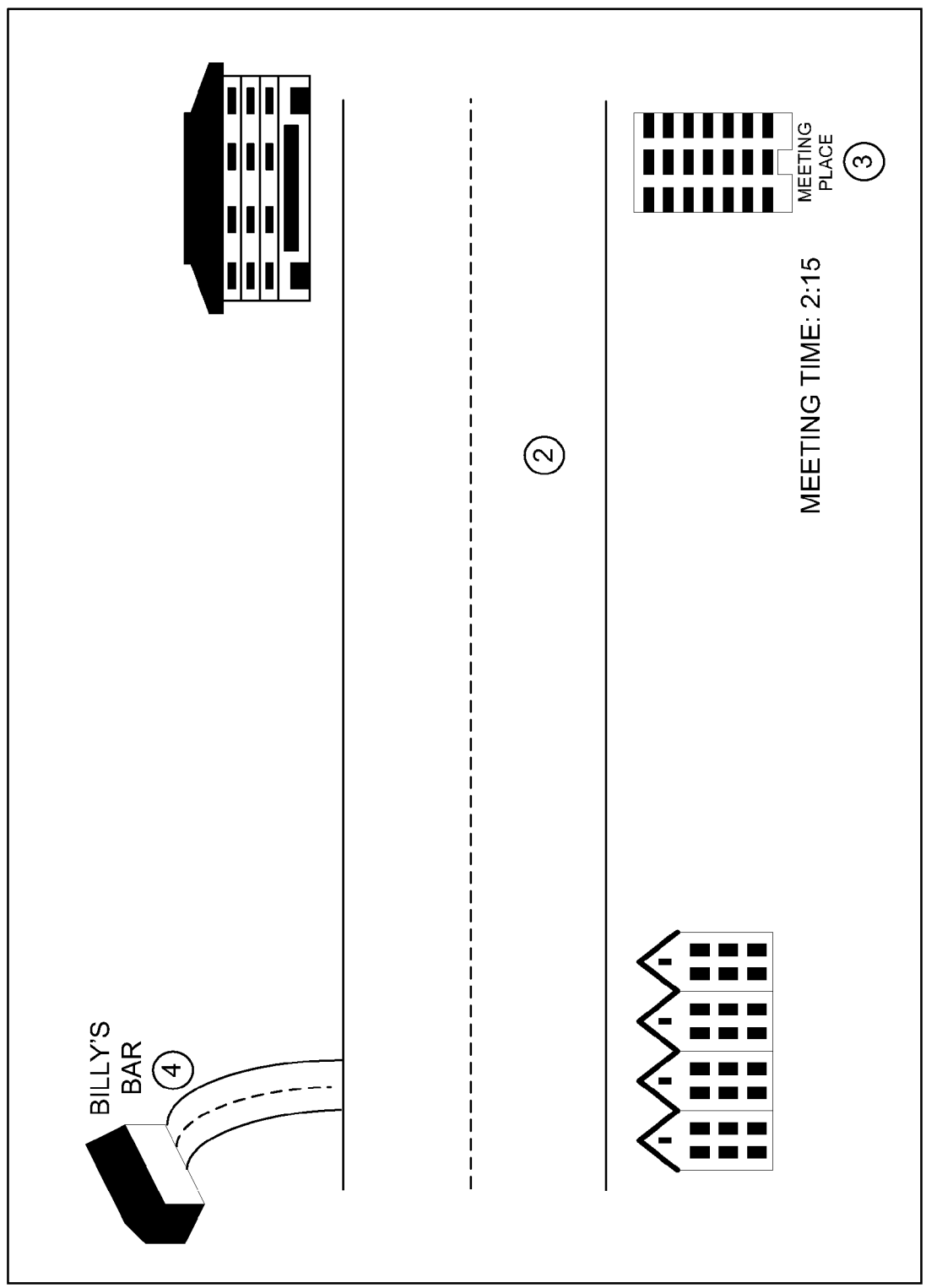

FIGS. 11-13 illustrate exemplary graphical user interfaces for a monitoring system for use as a meeting monitor according to one embodiment. A user, in this case, a meeting organizer or initiator, can access the graphical user interface using a desktop or laptop-type computer system 198 having an Internet connection to the world wide web, using Internet browser software. As provided in FIG. 11, upon connecting to the Internet or to a corporate (or other entity's) Intranet and entering the appropriate URL to access the monitoring website, the user enters an access code for the meeting. The user may then be presented with a list of names of persons who the user is authorized to monitor. These may be users that the meeting organizer has invited to attend a meeting. In this example, the user is authorized to monitor the wireless devices 114, such as mobile telephones carried by potential attendees of a meeting. The list provided to the user indicates whether the wireless communication device 114 for each of the individuals is on or off. From this list, the user selects which of the individuals to monitor. A meeting organizer in this example selects to monitor each of the users that have indicated that they are to attend a meeting planned by the organizer. Using the scheduled event time, meeting location, and list of attendees, it may be determined who has arrived and who has not at the meeting location and/or the estimated time of arrival and/or estimated time en route (based on current location and possibly traffic patterns and travel time) of those attendees not yet at the event/meeting.

Other interfaces may include location-based fields and location-security fields in a meeting invitation. Such fields may also be incorporated into an acceptance notice or input screen. For instance, example location security fields might include check boxes on a meeting acceptance page with the check boxes specifying whether to reveal location information to other meeting attendees who would not otherwise have access to a user's specific location. Also, the fields might specify a time range for disclosing the location information such as thirty minutes before the start of the meeting until thirty minutes after a meeting.

These location-based and location-security fields related to a meeting could be global parameters in a meeting or scheduling system (e.g., Microsoft Outlook), or they could be per meeting parameters that are changed for various types of meetings that a user books to his/her calendar. The default value for the security settings could be configured as a global value for the meeting or scheduling system with individualized control to change the fields/settings to specific values on each meeting. For some meetings, a user might want to disclose location information and not disclose the location information for other meetings. These types of settings could be configured as a global default that gets applies to every meeting unless the user specifically changes the settings in a configuration for a particular meeting.

FIG. 12 is an exemplary screenshot representation of a graphical user interface to the meeting program. In the example shown in FIG. 12, an interface showing a meeting status is provided. The interface includes a location status column 1110 and a tracking tab 1105. The tracking tab 1105 may be used by an organizer of the meeting request to determine who has responded to the meeting request with acceptances or declinations. The location column 1110 is a field (or set of fields) to show the status of meeting attendees and their likelihood of making the scheduled meeting.

In some embodiments, the location field 1110 for the meeting organizer also could include a location information status when a meeting attendee's location information was not available based on: security limits, location system unavailability, or the attendee totally powering down his wireless device, perhaps by removing the battery. For instance, the field could be set to "Loc Info Not Available" when a meeting attendee's location information was not available. Also, the field could be set to "Loc Info Will Be Available in 18 Minutes" for an attendee that allowed his or her location to be disclosed thirty minutes before a meeting that is scheduled to begin in 30+18=48 minutes. The thirty minute lead time for disclosing location information by relaxing security restrictions is a non-limiting arbitrary number, which could be configured by the attendee when he or she accepts the meeting, or at some other time before the meeting begins.

Accordingly, other interfaces to the meeting system may also include fields for the location system. For example, one set of fields may allow meeting notice recipients to change the security settings (as part of the process of acceptance of a meeting request) for disclosing their location information to the meeting holder and/or other meeting attendees. Another set of fields would provide the meeting organizer (and perhaps other attendees and other proxy individuals with the proper security permissions) information to determine the aggregated location status of several scheduled meeting attendees as the meeting approaches in time and actually occurs.

Likewise, fields in displays to the meeting organizer or other person with appropriate access could further provide estimated time of arrival (ETA) and/or estimated time en route as well as summarized information relative to the meeting start time such as displaying "Person X will be (or is expected to be) 10 minutes late for the start of the meeting." These estimates can be based upon historical and/or actual road traffic conditions and patterns as well as information on transit system and transit vehicle (such as airplanes, buses, trains, and boats/ships) delays and/or cancellations.

FIG. 13 provides an exemplary graphical user interface of the output for the monitoring system for monitoring potential attendees selected from FIG. 11. As can be seen, the screen display provides a map of the area surrounding the meeting location. The map is scaled such that each of the three individuals to be monitored appears on the same map. In this map, as can be seen, Jim ("3") is located at the meeting place, Jeff ("2") is located on the road leading to the meeting place, and Scott ("4") is located at Billy's Bar. The system may also provide the speed of movement of the wireless device 114 carried by an individual and the direction of travel. Depending upon the amount of information stored in the location database 140, the system could also provide a history of an individual's movement throughout the course of the day.

Options may be provided to re-scale the map or to display additional information in greater detail. In this case, the system may indicate that Scott has stayed at Billy's Bar for at least two hours, since noon. The system also provides an estimation that Scott is not on track to make the scheduled meeting.

According to exemplary embodiments, the monitoring system of the present disclosure can be configured with added features depending upon the specific application for which the system will be used. Embodiments can be used to monitor individuals who carry any of several different types of wireless communications products, such as the devices 114. As one example, the monitoring system of the present invention can be used to monitor the location of an individual carrying an interactive pager. Likewise, the system can also be used for monitoring the location of an individual who carries a personal digital assistant that is configured for wireless communication on the wireless network 110. For the purposes of this disclosure, the interactive pager or personal digital assistant transmits control signals in the same manner as cellular telephones, and can therefore be used as monitoring equipment in the same manner. As yet another feature of exemplary embodiments, a user who accesses the monitoring system through a website on the Internet may wish to leave a text message for an individual who is being monitored. For example, a supervisor may wish to leave a message for an employee. During the operation of the monitoring system, the graphical user interface can include a feature to leave a text message for a monitored individual. The entered text is then communicated from an http server 195 to the wireless network 110, and on through a control channel to the wireless device 114 at the location in which it is registered.

Instead of just providing location information to a central or third party system, a third party monitoring system could provide location information about other remote co-workers or employees to remote devices 114. For example, an attendee to a meeting can be notified of how many other attendees have arrived at the meeting location. As another example, a police officer may be notified of how close the next back-up patrol car is located. A service technician may be informed of the location of another service truck that might have a needed tool to complete a service call.

In general, a person may have a default level of privacy for various groups that allows each of these various groups (such as, but not limited to family, friends, co-workers, acquaintances, strangers) different levels of information about a person's location. However, from time to time a user may wish to modify the location security preferences to provide more or less accurate information to various groups of recipients. For example, a user may decide to allow co-workers to have more accurate information about a user's location when a user is scheduled to attend a meeting at work. A person may choose to allow the co-workers to have more accurate information (than the normal/default level of accuracy provided to co-workers) from a time beginning thirty minutes before a scheduled meeting until thirty minutes after a scheduled meeting. Then co-workers will have more information about whether to hold up starting the meeting for a minute or two based on a person's pending arrival in the building as determined by the accurate information about the person's location.

Furthermore, the relaxation of security/privacy rules to allow more accurate location information to be conveyed to co-workers can be based upon acceptance of a meeting invitation in a scheduling or appointment system such as, but not limited to, Microsoft Outlook™.

For users of wireless network devices 114, concerns over privacy are well founded, especially when considering the increasing convergence of wireless communication networks 110 with global computer networks 112. Wireless networks 110 are now routinely in communication with the global computer network 112, providing network users with expanded services such as Internet access through their wireless devices 114. Through this same link, wireless network providers can provide third parties, such as advertising web sites, with the identity and location information that the network provider is (or will be) required to monitor. Consequently, third parties are able to identify a network user and track that user's every movement. Accordingly, a user may desire to limit the scope of information available to a third party regarding the user's current location.

In one embodiment, geographical location information for the wireless devices 114 to be monitored is calculated by the location server 120 and output to the location database 140. The location database 140 maintains the geographical coordinates or a geographical description for each wireless device 114 to be monitored and an account number identifying the wireless device 114. In alternative embodiments, the location database 140 may additionally store information such as the speed of movement of the wireless device 114 and the direction of its movement, with the speed and direction together implying the velocity vector.

In one embodiment, the location database 140 is connected to http server 195 to provide information to the Internet. The information provided in the location database 140 may be combined with information provided by mapping software (or hardware) and information retrieval directories, and the output is displayed on a website as a graphical interface (such as that shown in FIG. 12). The website can be accessed by authorized users through various media, including the personal computer 198 or a wireless handheld device, such as the device 114.

Using various opt-in or opt-out default rules plus user-defined or service-provider-defined rules, the user of the remote device 114, such as a cell phone, pager, PDA, MP3 player, or GPS receiver, could control whether location information is provided to others and at what level of geographic accuracy.

The rules on providing location information could vary based upon one or more of the following as well as possibly other additional factors: who is receiving the information about the location of the user (e.g., family, friends/buddy list, stranger); the location of the user (e.g., restroom, at home, in the office); the defined characteristics of locations (such as fuzzy zones in bathrooms); and time of day, work day, and/or holiday scheduling (e.g., location information provided to co-workers 9 AM-5 M-F versus provided to family 24 hours/day×7 days/week).

For instance, a user may elect to give his family exact location information, while less well-known acquaintances may only be entitled to receive location information about the user being within a particular city. Also, location information could be blocked by the user, in some embodiments. Parents have a blocking override option with the interface to find out the location of their children's cell phones on which the children have tried to block location, in some embodiments.

In addition, location information may include purposely fuzzy or inaccurate zones in which the location information transmitted into the location database 140 is not exact. For instance, under a particular positioning system technology, the location information may be accurate to within three feet. However, a person going into an office building restroom may not want to divulge his location that accurately. Upon passing into a location zone defined by a threshold boundary of a bathroom door, the reported location may just specify the bathroom, but not the specific location within the bathroom. The remote devices 114 (or the network triangulation devices) could automatically report less accurate information about location whenever the user crosses into one of these "fuzzy" or less-accurate geographical zones.

Accordingly, location information of a user may be purposely provided in a less accurate manner for privacy reasons. However, the accuracy of the mobile location information can be controlled at a finer granularity than just an on/off decision of allowing or not allowing accurate location information to be delivered to a specific group of users with authorized access. Instead, an employee may want to receive an incoming phone call and let his boss know that the employee is in the general vicinity of the office, but the employee may not want to let his boss know that the employee is in the restroom or even a specific stall in the restroom (if the location information is capable of providing that level of accuracy). Instead, users of location services may want certain geographical zones of privacy in which the location information is purposely provided to other people communicating with the users in a way that has less accuracy than the location system is capable of providing. Furthermore, users may wish to provide "dummy" information about their location for security reasons and other purposes. For example, a user may want to provide dummy information about being "in the office", when the user is really out on a sales call at a business. Also, someone who is out-of-town on vacation may not want to disclose that he is out-of-town to every person with whom he communicates while on vacation. For business reasons and/or security reasons (related to the current occupancy of a person's residential home), a person may want to provide location information that indicates that the person is in town as opposed to being out-of-town.

In one embodiment, a pseudo-location service for use in wireless networks that track the locations and identities of network users provides pseudo-location information for a network user. The pseudo-location service provides a wireless network user with the ability to prevent the current location of her wireless handheld device 114 from being disclosed to parties other than the wireless network provider and possibly emergency personnel, such as a 911 response unit. The present disclosure contemplates future enhanced digital cellular networks, in which network users will use digital cellular handheld devices to access data from the global computer network 112, and in which digital cellular network providers will track the identity and location of each network user.

Referring to FIG. 13, in an exemplary embodiment, the wireless device 114 include a user interface 1210 and a pseudo-location processor 1230, and the wireless network 110 includes a pseudo-location network processor 1240 for providing pseudo-location service. User interface 1210 and the pseudo-location processor 1230 are provisioned in the wireless handheld device 114 and are in communication with each other. The pseudo-location network processor 1240 is provisioned in the wireless network 110. In the context of an entire network, wireless network 110 is in communication with the plurality of handheld devices 114, and the pseudo-location network processor 1240 would be in communication with a plurality of user interfaces.

The device-based location system 115 and the network-based location system 111 provide the location of the wireless handheld device 114. Depending on the desired degree of accuracy, one or both of the location systems 111, 115 can be used to determine a device's location. As previously discussed, one embodiment of the device-based location system 115 is the GPS receiver 116 provisioned in the wireless handheld device 114. One embodiment of the network-based location system 111 is a WAP location service.

According to exemplary embodiments, the user interface 1210 is an application that operates on the wireless handheld device 114 and enables communication between the user of the device 114 and the pseudo-location processors 1230 and 1240. The user interface 1210 may prompt the user of handheld device 114 to enter commands initiating or suspending pseudo-location activities. Examples of suitable user interfaces include menu selections, key sequences such as "*87", and graphical user interfaces (provided that the hardware and memory support such applications). In accordance with the user's command, the user interface 1210 alters the way in which the pseudo-location processors 1230 and 1240 operate. The user interface 1210 may recognize from where location information originates, and communicates with the appropriate pseudo-location processor 1230, 1240. That is, if the device-based location system 115 provides the location information, the user interface 1210 directs either of the pseudo-location processors 1230 or 1240 to replace the location information with a pseudo-location. Correspondingly, if the network-based location system 111 provides the location information, the user interface 1210 directs the pseudo-location network processor 1240 to replace the location information with a pseudo-location.

The pseudo-location processor 1230 and the pseudo-location network processor 1240 are applications that receive and execute commands from the user interface 1210, according to exemplary embodiments. Primarily, the pseudo-location processors 1230 and 1240 replace location information with pseudo-location information. For example, the processors 1230 and 1240 can disable a location system and substitute pseudo-location information or can receive location information and substitute pseudo-location information. Substituting pseudo-location information could comprise substituting location information that is near the current location or at a set distance from the current location. For example, pseudo-location information may be set to be five miles to the west of the current location. Alternatively, a predefined location may have been previously designated as a substitute for a current location. For instance, a user may designate that a location corresponding to the entrance of the user's work center is to be used as a pseudo-location for the location corresponding to the work center's restroom facilities.

To substitute pseudo-location information, the pseudo-location processor 1230 may either disable the device-based location system 115 or substitute pseudo-location information for the location information that system 115 provides. The pseudo-location network processor 1240 may remove location information from transmissions before they are forwarded outside of the wireless network 110. If the location information originates from the device-based location system 115, the pseudo-location processor 1230 removes the location information from the transmission and substitutes pseudo-location information, according to exemplary embodiments. If the location information originates from the network-based location system 111, the pseudo-location network processor 1240 may either disable the network-based location system 111 or substitute pseudo-location information for the location information received from the network-based location system 111.

As one of ordinary skill in the art would understand, the pseudo-location network processor 1240 could be a separate component of the wireless network 110, or could be a part of a proxy server that acts as an intermediary between a plurality of handheld devices and the computer network 112 to provide routing selection (i.e., what transport bearer is to be used), access control, addressing, protocol conversion (i.e., WML text to WML binary), caching, and transport interface between wireless and wired networks (e.g., WAP stack to traditional IP stack, HTTP/TCP/IP). The proxy server may be associated with or part of a gateway server that separates the wireless network 110 from the computer network 112, such as the Internet. The proxy server could also be associated with a firewall server that protects the wireless network 110 from intrusion via the computer network 112.

Figure 14:
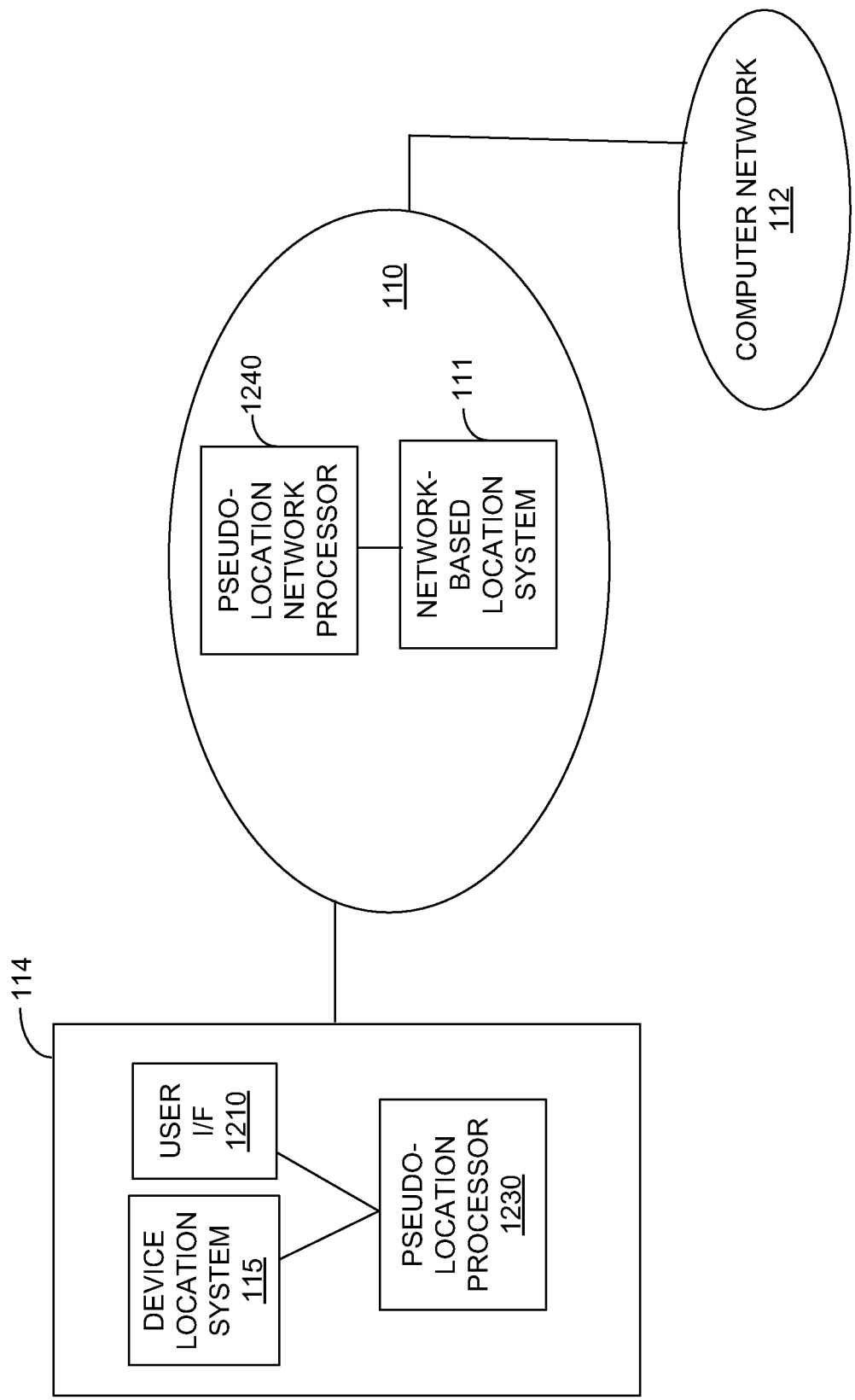
FIGS. 14-15 are block diagrams of system architectures for providing pseudo-location services in accordance with the system of FIG. 1.

Based on the system architecture shown in FIG. 14, exemplary embodiments provide pseudo-location services by several exemplary methods, depending on which location system 111, 115 provides the location information: 1) If both the device-based location system 115 and the network-based location system 111 provide location information, the user interface 1210 directs the pseudo-location network processor 1240 not to forward location information; 2) If only the device-based location system 111 provides location information, the user interface 1210 directs either the pseudo-location processor 1230 or the pseudo-location network processor 1240 not to forward the location information; and 3) If only the network-based location system 111 provides the location information, the user interface 1210 directs the pseudo-location network processor 1240 not to forward the location information.

In one embodiment, the user interface 1210 can enable the user to establish a user profile, to be stored in the pseudo-location processor 1230 or the pseudo-location network processor 1240, as appropriate for the active location system 111, 115. The profile specifies conditions under which location information is blocked for a user. These conditions can include such parameters as the recipient of the transmission, the time of day, and the location of the user (i.e., if the user never wants to be caught in a particular location, she can specify that that location always be substituted with a pseudo-location). The user interface 1210 allows the user to establish, edit, enable, and disable the profile. When the profile is enabled, the pseudo-location processor responsible for replacing the location information (processor 1230 or 1240) may evaluate the transmission to see if the transmission meets the profile parameters, and if so, replaces the location information with the appropriate pseudo-location. Thus, for example, if a user has specified that his or her employer is not to receive accurate location information, the pseudo-location processor 1230 or 1240 reads each data transmission to ascertain the recipient, compares the recipient to the names of the user's employers in the profile, and replaces the location information with pseudo-location information if the recipient's name matches those names (of the employers) listed in the profile.

Figure 15:
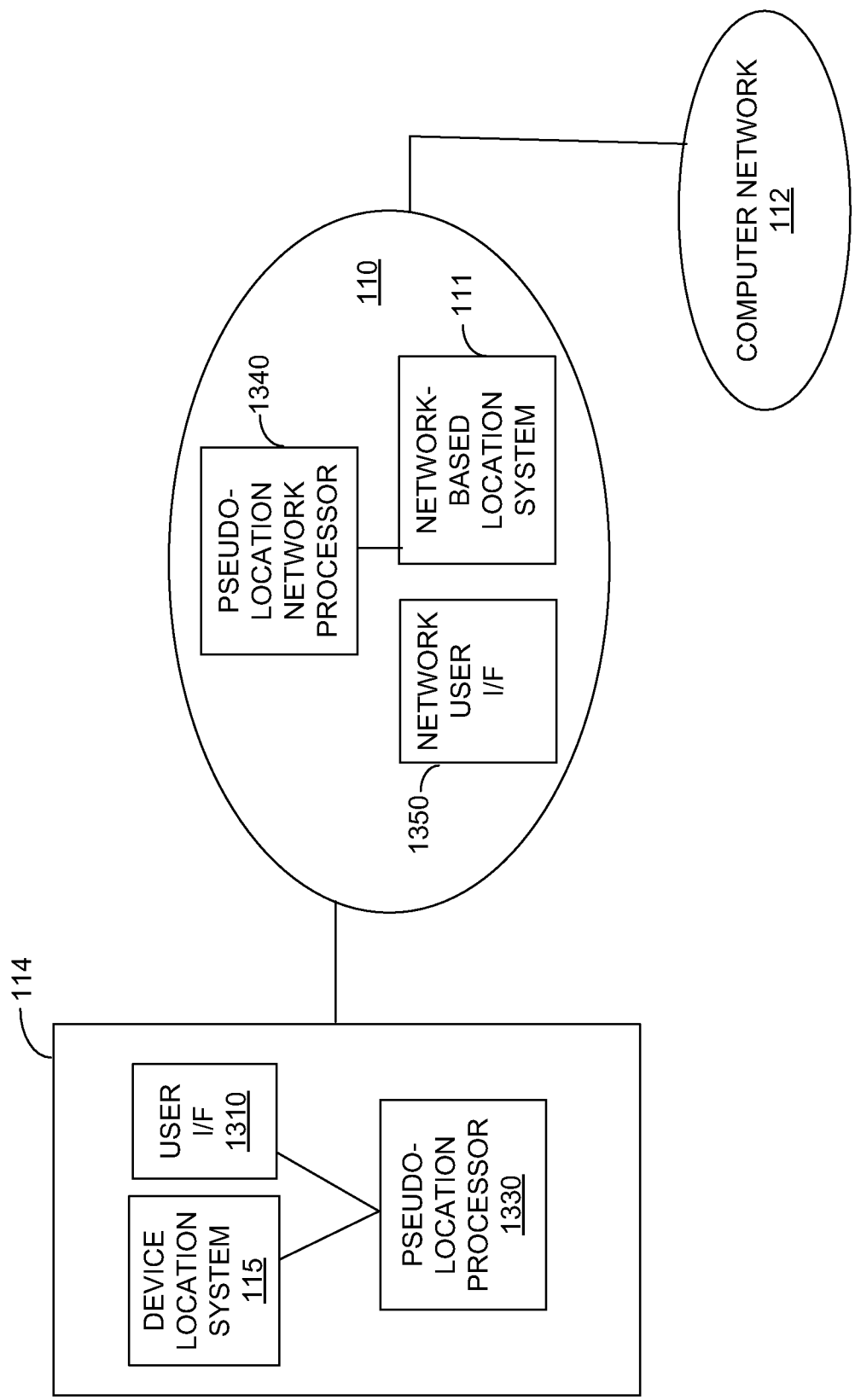

FIG. 15 illustrates an alternate embodiment of the present disclosure in which a pseudo-location network user interface 1350 is provisioned in wireless network 110, in communication with the pseudo-location network processor 1340. The pseudo-location network user interface 1350 provides an alternate means of initiating or suspending pseudo-location services and for altering user profiles. Unlike the user interface 1310, which operates on device 114, the pseudo-location network user interface 1350 operates within the wireless network 110. For example, the pseudo-location network user interface 1350 could be a web-enabled graphical user interface accessible by a network user through the computer network 112. In this manner, a user would access the web page of the graphical user interface 1350 and change the parameters to affect the desired pseudo-location service. This web accessible interface 1350 would be especially beneficial for users who prefer to establish pseudo-location services for certain recipients only, because such a service would require a considerable amount of detailed input by the user.

According to one embodiment, the processors 1330 and 1340 are programmed to override pseudo-location services when necessary. For example, even if the user has chosen to activate a pseudo-location service for all transmissions, the pseudo-location processors 1330 and 1340 automatically reactivate the location service if the user dials 911 so that an emergency response service receives the critical location information. In another embodiment, a wireless network pseudo-location service is provided irrespective of related services.

Figure 17:
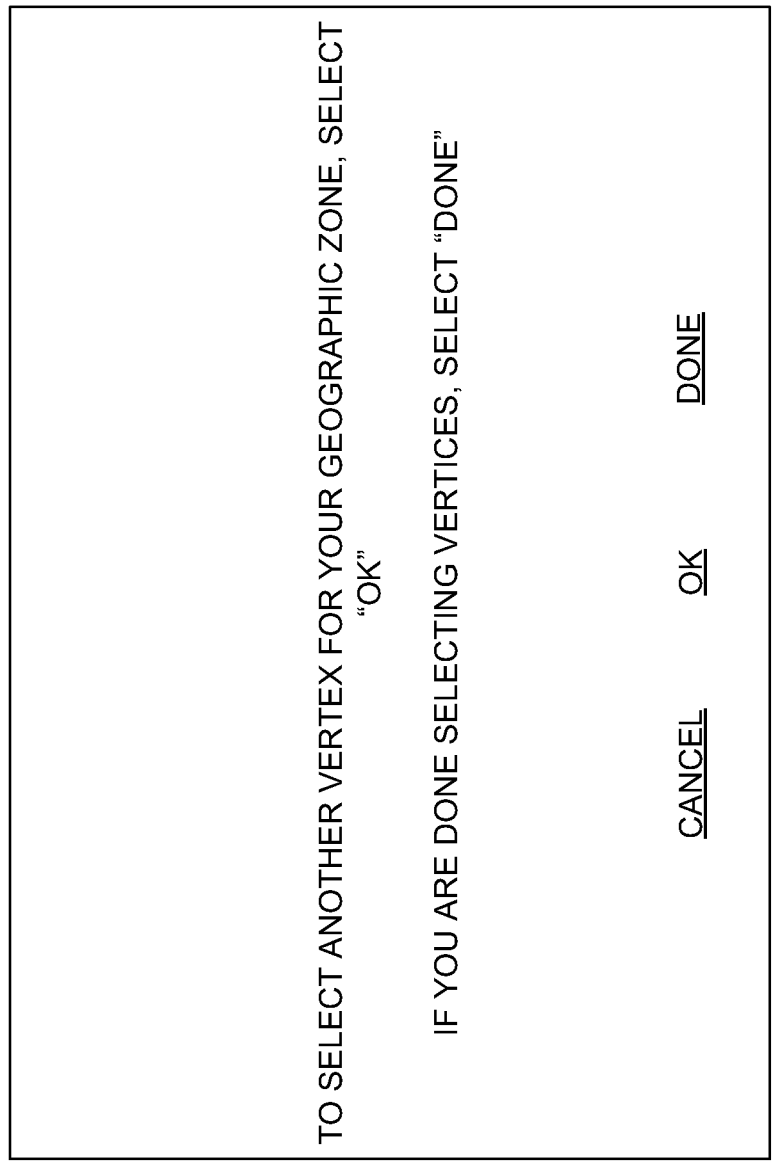
Figure 18:
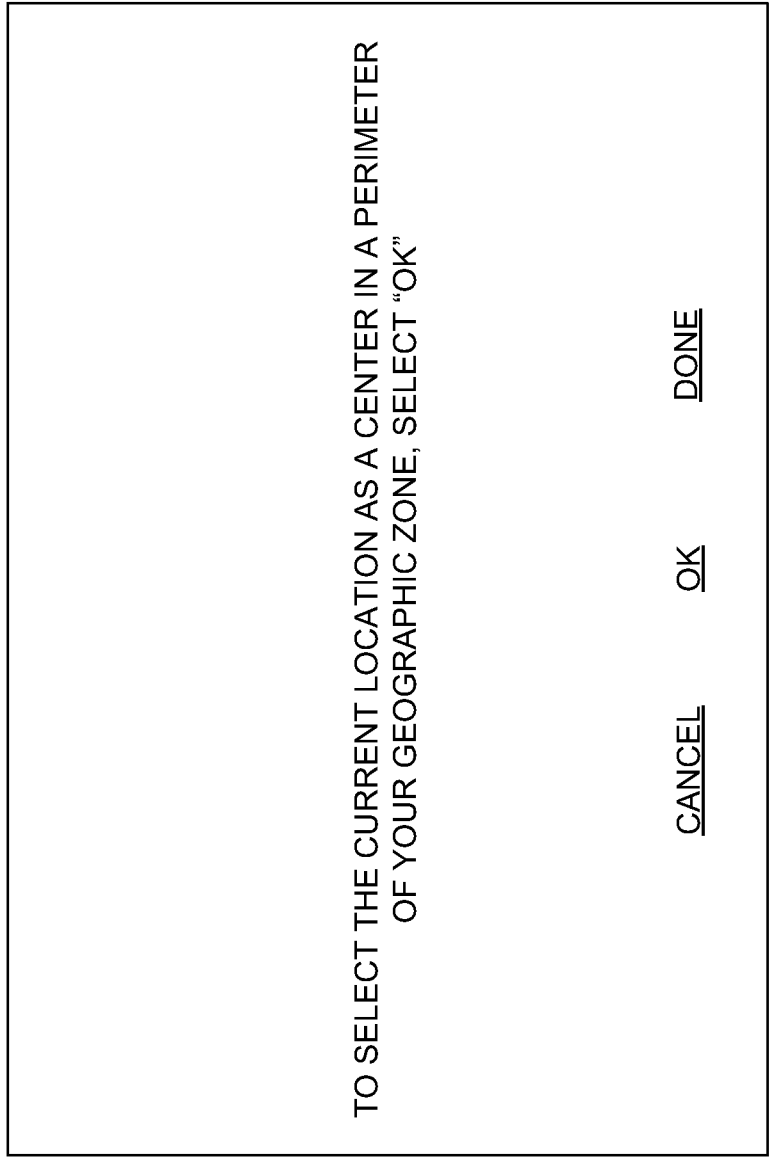
Figure 19:
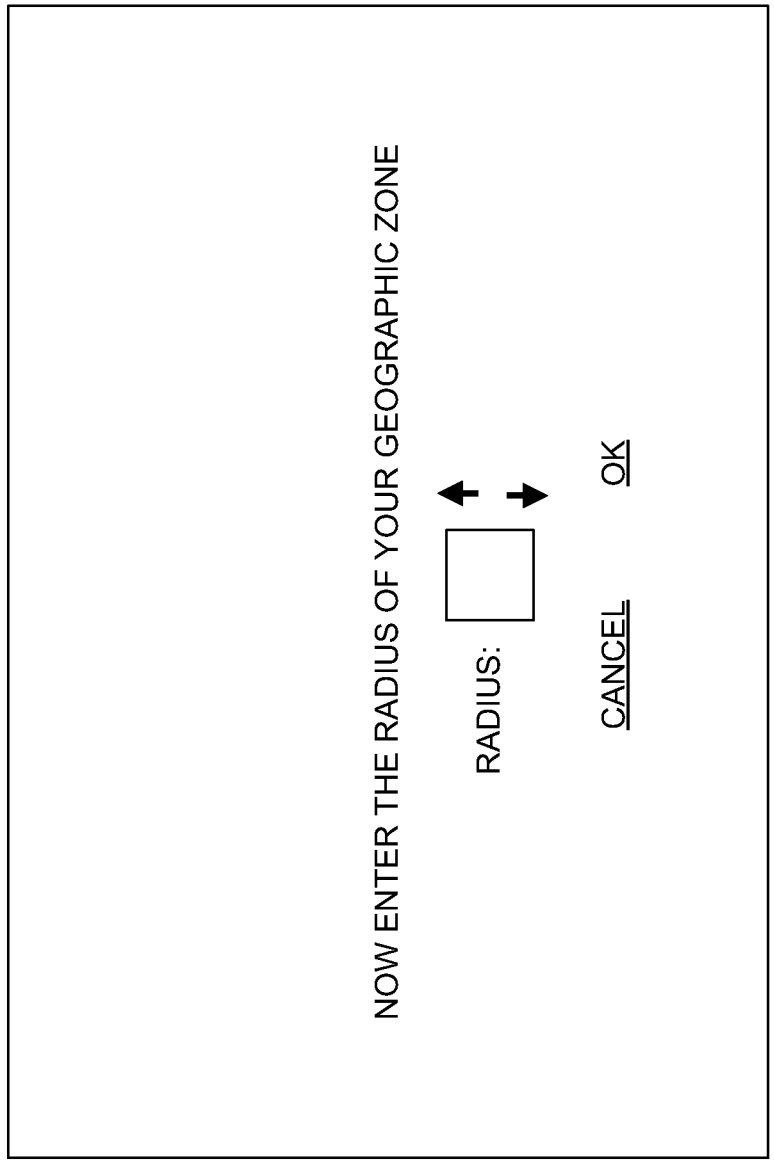

To establish geographic zones, a user may utilize the user interface 1210, 1310 of the wireless device 114 or the user interface 1350 of the wireless network 110 to select points or nodes to define the zone. For example, FIG. 16 illustrates an interface screen which prompts a user to select a current location as a vertex within a geographic zone being established by the user. Therefore, the user may physically walk to a physical location where the user wants to establish a geographic zone and by using the user interface 1210, 1310 and selecting an OK button or by selecting a graphical OK link on the device display, a user can enter a vertex within a geographic zone. After the user has entered all the desired vertices, then the vertices are connected to establish a perimeter or zone. Accordingly, FIG. 17 illustrates an interface screen prompting a user to select a Done link to indicate that all the desired vertices have been entered. Alternatively, to establish a geographic zone, the user may input a current location, as identified by the GPS receiver 116 of the wireless device 114 for example, as a center of a circular perimeter or zone. FIG. 18 illustrates an interface screen prompting a user to input such a point. After the center is specified, then the user can input a radius for the circular perimeter or zone, as illustrated in FIG. 19. Accordingly, using the above approaches, a user can define a geographic zone. In accordance with one embodiment, the geographic zone is used to map a current location that falls within the zone to a pseudo-location. Similarly to the above approaches, a user may also specify the pseudo-location. For example, a user may physically move to a location which will be identified by the GPS receiver 116 of the wireless device 114 of the user. As shown in FIG. 20, a user interface, such as the user interface 1210, 1310, of the device 114 may enable a user to select the location as a pseudo-location.

Figure 21:
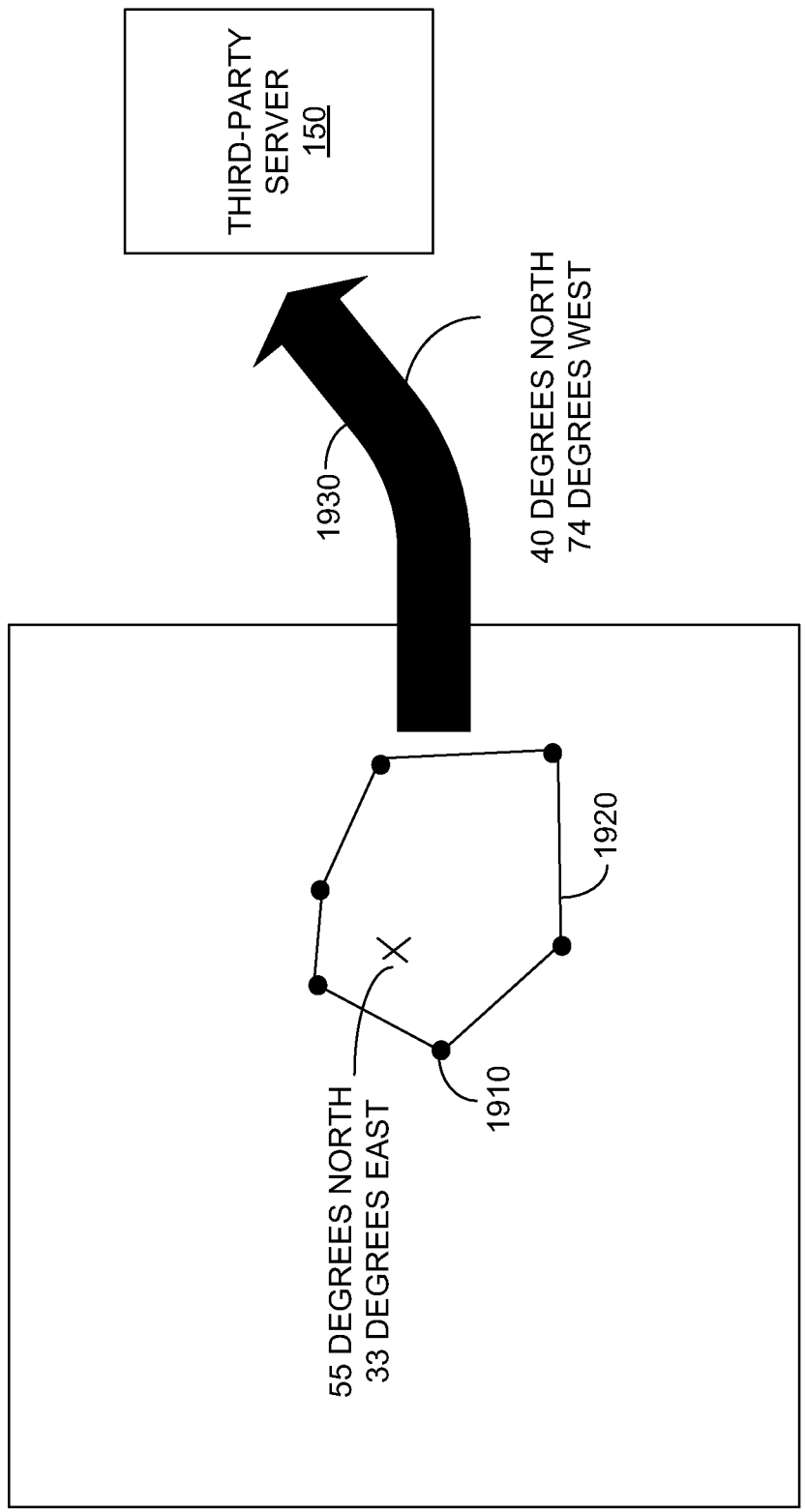
FIG. 21 is diagram depicting a process for relaying pseudo-location information for a user's current location in accordance with the system of FIG. 1.

Referring now to FIG. 21, one embodiment of the present disclosure is figuratively represented. As shown, vertices 1910 inputted by a user help define a geographic zone 1920. Therefore, when the wireless device 114 enters a location represented by the zone 1920, the location system 111, 115 may report the location, as reflected by the arrow 1930, as a pseudo-location to the third party server 150. In the example, the correct location of the wireless device 114 is 55 degrees north and 33 degrees east. However, in accordance with exemplary embodiments, a pseudo-location is reported corresponding to 40 degrees north and 74 degrees west.

In one embodiment, user interface screens provided on the wireless device 114 may allow a user to select individuals from the user's "buddy" or contact list or address book as recipients for pseudo-location information, as represented in FIG. 22.

Figure 23:
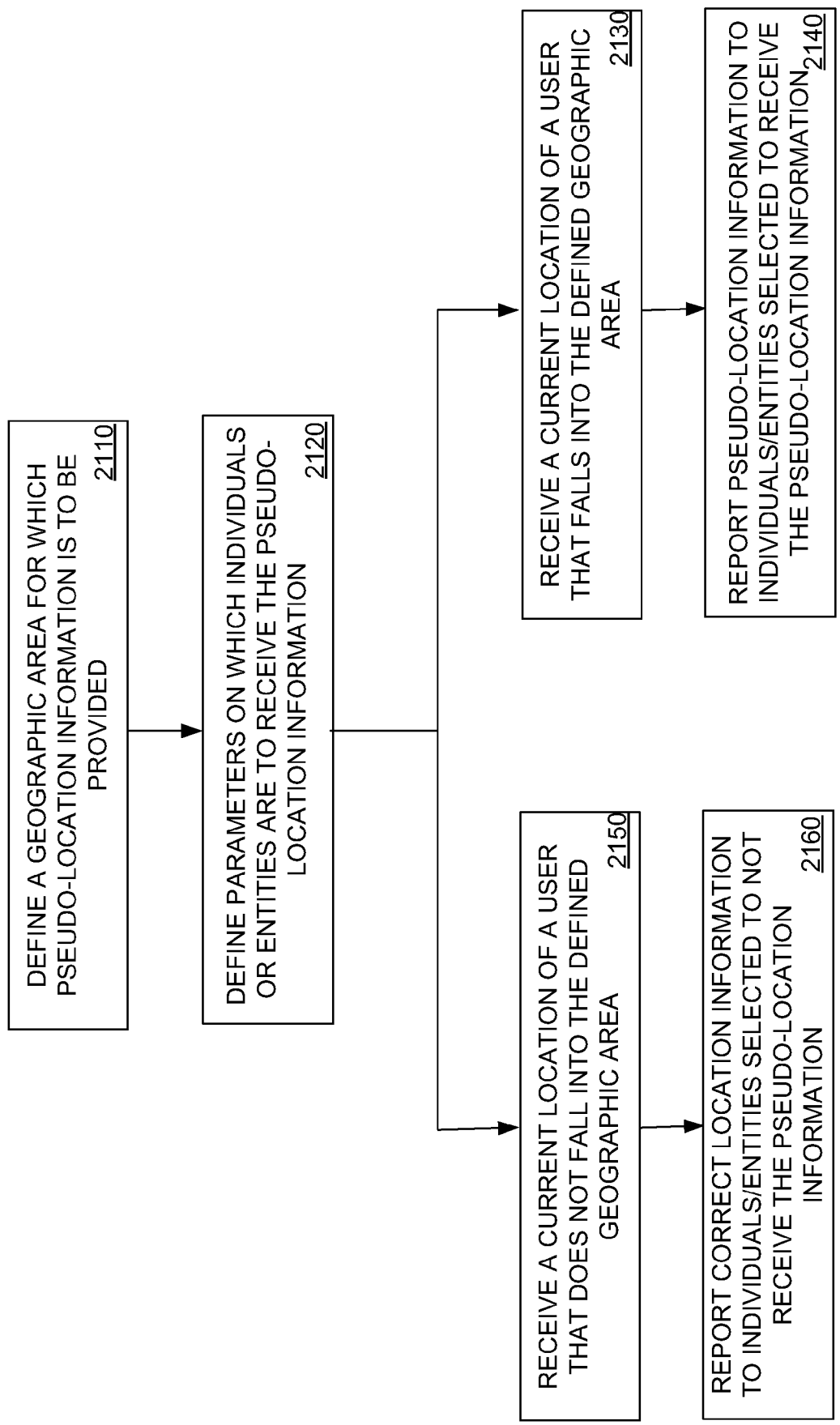
FIG. 23 is a flowchart diagram of one embodiment, among others, of a method for instituting privacy control of location information in accordance with the system of FIG. 1.

FIG. 23 is a flowchart describing one embodiment of a method for instituting privacy control of location information. One embodiment of such a method includes defining (2110) a geographic area for which pseudo-location information is to be provided (via wireless device 114, location server 120, and/or third party server 150). The method further comprises defining (2120) parameters on which individuals or entities are to receive the pseudo-location information (via wireless device 114, location server 120, and/or third party server 150). Accordingly, if a current location of a user is received (2130) that falls into the geographic area, then pseudo-location information is reported (2140) to individual(s) or entities selected for receiving the pseudo-location information (via wireless device 114, location server 120, and/or third party server 150). Otherwise, if a current location of a user is received (2150) that is outside of the defined geographic area, then the correct location information is reported (2160) to individual(s) or entities not selected for receiving the pseudo-location information (via wireless device 114, location server 120, and/or third party server 150).

In some embodiments, whether creating a geographic zone for providing pseudo-location information or a zone or a geographic zone for adjusting device features, a user interface, such as the user interface 1210, 1310, may be provided on the wireless device 114 that allows the user to select popular geographic zones in the user's area or an area inputted by a user (via a zip code, for example). For example, FIG. 24 shows a screen interface allowing a user to select to implement a geographic zone according to establishments in the user's area, such as baseball park Turner Field, sports venue Philips Arena, and/or music and show venue Fox Theater.

While the system operation described herein and illustrated in the diagrams and flowcharts contains many specific details, these specific details should not be construed as limitations on the scope of the disclosure, but rather as an example of embodiments thereof. As would be apparent to one of ordinary skill in the art, many other variations on the system operation are possible, including differently grouped and ordered method steps. Accordingly, the scope of the disclosure should be determined not by the embodiments illustrated, but by the appended claims and their equivalents.

In the future, due to the mandate to establish E911 services, the wireless network 110 will be monitoring the locations and identities of the wireless handheld devices 114 for emergency purposes. As a result, network service providers will presumably attempt to capitalize on the mandated service by providing the locations and identities to web sites. Among other possible applications, web sites will use the valuable information to direct targeted advertisements to the handheld devices 114. For example, web sites may wish to locate wireless handheld devices 114 near a retail store, and send those devices an advertisement encouraging the network users to visit the store.

Figure 25:
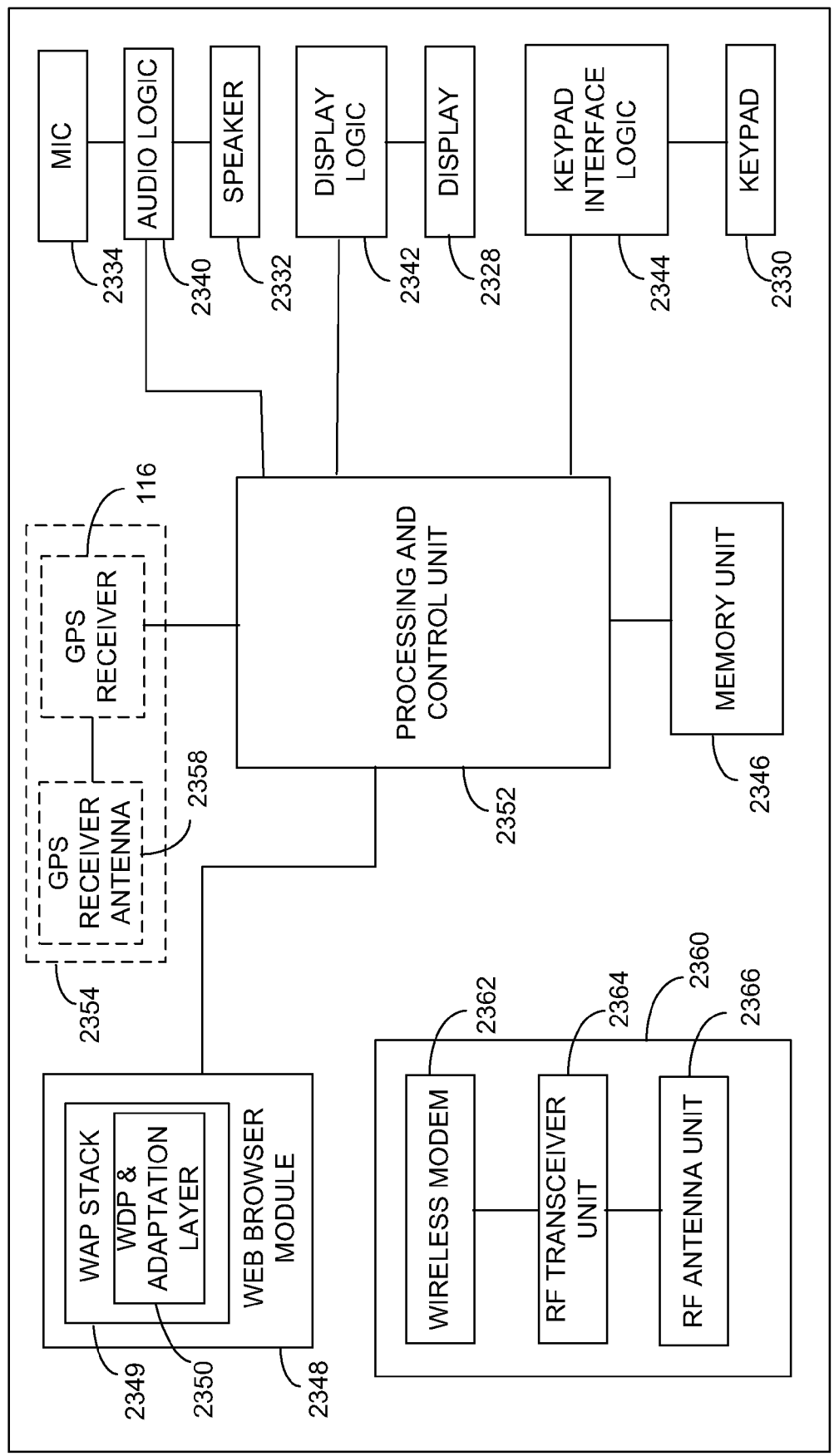
FIG. 25 is an exemplary block diagram, among others, of a wireless communication device in accordance with the system of FIG. 1.

FIG. 25 is an exemplary block diagram showing circuit blocks constituting one embodiment, among others, of the wireless communication device 114 and particularly, a cell phone. The cell phone 114 includes a display screen (or "display") 2328, a keypad or keyboard 2330, a speaker 2332 and a microphone 2334. The keys or "buttons" on the keypad 2330 may be provided as, for example, push-button keys or computer keyboard-type keys or membrane keys or any other suitable design configuration. The choice of the type of keys on the keypad 2330 may thus depend on design and aesthetic considerations including, for example, the size, the weight and the desired physical contours for the cell phone 114. The display screen 2328 may display text or graphic messages thereon. For example, when the user browses the Internet 112, the display screen 2328 may display the content of web pages for the user to look at. In one embodiment, the display screen 2328 may be an LCD (liquid crystal display) display. In alternative embodiments, the display screen may be, for example, a TFT (thin film transistor) active matrix display or a touch-sensitive screen.

Additional circuit elements include an audio logic unit 2340, a display logic unit 2342, a keypad interface logic unit 2344, a memory or storage unit 2346, a web browser module 2348 and a network interface unit (NIU) 2360. These circuit elements are shown coupled to a processing and control unit (PCU) 2352 that manages and controls various operations performed by these circuit elements, including tracking and monitoring operations in accordance with the present disclosure. The NIU 2360 may include a wireless modem 2362, an RF (radio frequency) transceiver unit 2364 and an RF antenna unit 2366 so as to enable the web browser module 2348 to transmit and receive digital information over the Internet 110.

The audio logic unit 2340 may be connected to the microphone 2334 and the speaker 2332. The speaker 2332 may be activated by the audio logic unit 2340 when, for example, the PCU 2352 informs the audio logic unit 2340 that the MS has initiated a telephone conversation. Voice messages may first be received by the PCU 2352 (via the NIU 2360) and the PCU 2352 may transmit these signals to the audio logic unit 2340 to be sent to the speaker 2332 for generating audible sound. Alternatively, any digital audio files received by the cell phone 114 (using the NIU 2360) over the Internet may first be sent to the web browser module 2348 to retrieve the audio file data therefrom. The browser module 2348 may then send the audio data to the PCU 2352, which, in turn, forwards the audio data to the audio logic unit 2340 and eventually to the speaker 2332 for audible playback.

The user of the cell phone 114 may speak into the microphone 2334 to transmit the user's voice during, for example, a telephone conversation. The audio logic unit 2340 receives the electrical audio signals from the microphone 2334 and sends them to the PCU 2352, which, in conjunction with the NIU 2360 transmits the user's voice to the wireless network 110. In one embodiment, the PCU 2352 may generate digital audio files from the analog audio signals received from the microphone 2334. The browser module 2348 may send TCP/IP messages over the Internet containing these digital audio files so as to allow the user to carry out voice communication over the Internet. The digital audio file formats may include file extensions such as, for example, ".WAV" (wave file), ".AIFF" (Audio Interchange File Format), ".AU" (audio file), etc.

The display logic unit 2342 monitors and manages display functionality for the cell phone 114. The PCU 2352 may generate proper commands and signals for the display logic unit 2342, which, in turn, may control the display of visual information on the display screen 2328. The display screen 2328 may display various information such as, for example, an e-mail message received over the Internet, any data entered via the keypad 2330 or an intimation of which action is being performed by the cell phone 114. For example, a message such as "ACCESSING THE INTERNET" may also be sent to the display logic unit 2342 (to be displayed on the display screen 2328) by the PCU 2352 once the PCU 2352 receives an indication from the web browser module 2348 that Internet access is in progress. Other messages may also be conveniently displayed on the screen 2328. For example, as soon as the user presses a key on the keypad 2330, the corresponding digit, symbol or command may be displayed on the display screen 2328 by the display logic unit 2342.

The keypad interface logic 2344 is coupled to the keyboard 2330 and receives signals sent from the keyboard 2330 when the user presses one or more keys thereon. The user may enter data such as, for example, a telephone number, a web address, an e-mail message, etc., using various keys on the keypad 2330. The web browser module 2348 may need a portion of such data to determine how to access content over the Internet. Furthermore, the user may also prefer to enter personal information about the user, e.g., the user's name, the address of the user's contact location, any known medical condition, etc., using keys on the keypad 2330 and store that personal information in the memory unit 2346.

The keypad interface 2344 transmits the signals received from the keyboard 2330 to the PCU 2352 for further processing. The PCU 2352 decodes the received signals and accordingly instructs the appropriate circuit elements for necessary action. For example, when the user enters the user's personal information, the keypad interface logic 2344 may send all the data to the PCU 2352, which may instruct the memory unit 2346 to store the received data therein. The PCU 2352 may store the user's personal identification information in the memory 2346 using one of a number of digital text formats, e.g., HTML (Hyper Text Markup Language) format, ASCII (American Standard Code for Information Interchange) format, XML (Extensible Markup Language) text file format developed by W3C (World Wide Web Consortium), etc.

In one embodiment, the cell phone 114 may include a text-to-speech (TTS) converter (not shown). The TTS conversion functionality may be implemented with appropriate software residing in the PCU 2352. The TTS converter may work with an SGML (Standard Generalized Markup Language) format-based TTS markup language. The SGML format may be based on the ASCII text format. An example of an SGML-based TTS markup language includes the STML (Spoken Text Markup Language) developed by Lucent Technologies of Murray Hill, N.J., U.S.A. In that embodiment, the cell phone 114 may be configured to receive an e-mail or other messages in the SGML format over the Internet. The TTS converter may convert the received text file (in the SGML format) into an STML file that can be audibly played back by the audio logic unit 2340. The user of the cell phone 114 can thus hear, in a synthesized voice, the content of the message sent in a digital text format.

The memory or storage unit 2346 provides memory for storage of data, such as the user's personal information as discussed hereinbefore. The data stored locally in the memory unit 2346 may be text, audio or video data and may include a number of digital file formats as described hereinbefore. For example, data that may be sent over the Internet may be in the HTML or the WML (Wireless Markup Language) formats. The memory unit 2346 may be located inside the cell phone 10 or, alternatively, may be supplied as a memory cartridge (not shown) that may be attached to the cell phone 114 at an appropriate adapter slot (not shown) provided on the housing for the cell phone 114.

The memory unit 2346 may include volatile and/or non-volatile memory, such as RAM (Random Access Memory), ROM (Read Only Memory), EEPROM (Electrically Erasable Programmable Read Only Memory) or similar memory units. A volatile memory may lose the data stored therein if the power applied thereto is removed. The personal information about the user (as an audio file or as a text file) may be stored in the non-volatile portion of the memory 2346. On the other hand, the content of a web page accessed through the web browser 2348 may be stored in the volatile portion (or temporary storage) of the memory 2346.

The web browser module 2348 may include software code or routines which, when executed by the PCU 2352, perform web browser functions upon execution. In one embodiment, the web browser module 2348 may be implemented using a combination of software and hardware elements. The web browser software may include, for example, an HTML browser or a WAP (Wireless Application Protocol) browser because of the small size and portable nature of the cell phone 114 and because of the smaller display 2328 and limited memory space (in the memory unit 2346) available for the cell phone 114. The HTML browser may "read" information received or stored in the HTML format, whereas the WAP browser may be able to "read" information having WAP content (e.g., information in the WML (Wireless Mark-up Language) format). In the embodiment illustrated in FIG. 25, the web browser module 2348 includes a WAP browser that wirelessly connects the cell phone 114 to the Internet.

The web browser 2348 may be activated using one or more keys on the keypad 2330 and may be used for surfing the world wide web portion of the Internet. The web browser module 2348 interacts with the PCU 2352 to execute necessary software routines for Internet access. The software routines, upon execution, activate the wireless modem 2362 in the NIU 2360 to accomplish dialed Internet access via the wireless network 110. In one embodiment, the web browser module 2348 (including its hardware and/or software elements) may be a part of the PCU 2352 and the PCU 2352 may directly perform web browsing or information delivery over the Internet.

Inclusion of the web browser 2348 within the cell phone 114 may result in a standardized information interface for the cell phone 114 because it dispenses with the need to have a proprietary format for information transmission, storage and display. The messages to and from the cell phone 114 need not have to be in a proprietary format, but, instead, may be in a generally available text format, e.g., the HTML format or the WML format. This allows for ease of Internet communication with the cell phone 114 because of the use of TCP/IP data packets over the Internet for information exchange.

As noted hereinbefore, the web browser module 2348 includes the WAP browser software represented as a WAP stack 2349. The WAP architecture provides a scaleable and eXtensible environment for application development for mobile communication devices such as, for example, the cell phone 114. The WAP protocol is designed in the form of a layered architecture wherein each of the layers is accessible by the layers above, as well as by other services and applications running on the WAP platform. The WAP stack 2349 has the application layer (not shown) at its top, which is successively followed by the session layer (not shown), the transaction layer (not shown), the security layer (not shown) and the transport layer, which is referred to as a WDP (Wireless Datagram Protocol) and Adaptation layer 2350 in FIG. 25 (and interchangeably referred to hereinbelow as "the WDP layer" or "the adaptation layer" for the sake of clarity).

The WDP layer 2350 is the lowest layer in the WAP stack that is in direct contact with a physical network carrying the WAP data. The WDP layer 2350 operates above the data-capable bearer services supported by various physical networks. A bearer service is a data transport mechanism that carries the WDP protocols between two devices. Some non-limiting examples of bearer services include, for example, SMS (Short Message Service), circuit switched data and packetized data. Non-limiting examples of some physical networks that carry the bearer data include a GSM (Global System for Mobile Communications) or another TDMA-based (Time Division Multiple Access) wireless network, a wireline network (e.g., the PSTN or the Internet), etc. The WDP protocol can be mapped onto different bearers, with different characteristics. The adaptation layer 2350 is the layer of the WDP protocol that maps the WDP protocol functions directly onto a specific bearer. Thus, operationally, the WDP layer 2350 provides convergence between a given bearer service and the rest of the WAP stack 2349. The content of the adaptation layer 2350 may be different for each bearer depending on, for example, specific capabilities and characteristics of that bearer service.

In the embodiment of FIG. 25, the WDP and adaptation layer 2350 in the WAP stack 2349 may map WDP protocol functions onto the packetized data (i.e., the bearer service) supported by the wireless network 110 to facilitate communication between the web browser module 2348 and the remote source of data. The WDP layer 2350 may thus adapt the datagrams transmitted and received thereby to conform to the data transmission protocol specified by the physical data carrier network, i.e., the wireless network 110. As noted hereinbefore, the WAP browser in the web browser module 2348 may communicate with the remotely-located source of data using a WAP-supported data format, e.g., the WML format. For bearer services supporting IP (Internet Protocol), the WDP protocol may be UDP (User Datagram Protocol) that provides port-based addressing (e.g., source port, destination port, etc.) which may be combined with the segmentation and reassembly features of IP-based routing to implement a connectionless datagram service between two devices.

The PCU 2352 manages and controls various operations performed by different circuit elements connected thereto. The PCU 2352 functions as a centralized location to send and receive various commands and information. For example, the PCU 2352 may receive a signal from the keypad interface logic 2344 when the MS wishes to access the Internet. In response, the PCU 2352 may execute the web browser software in the browser module 2348 to initiate an Internet connection. The PCU 2352 may receive content of a web page or an e-mail over the Internet and may, in turn, instruct the display logic 2342 to display the received web page or e-mail on the display screen 2328. Alternatively, the PCU 2352 may instruct the TTS converter (not shown) to audibly "play" a message text using the audio logic unit 2340 and the speaker 2332 as described hereinbefore. During web browsing, the PCU 2352 may also execute audio and video data files received from the Internet using the web browser module 2348 and send appropriate audio and video signals to the audio logic unit 2340 and the display logic unit 2342 respectively.

The cell phone 114 may include some additional optional circuit elements such as, for example, a user location identifier 2354 including a GPS (Global Positioning System) receiver 116 and a GPS receiver antenna 2358. The GPS receiver antenna 2358 may be provided on the cell phone 114 to continuously receive location signals from geo-stationary satellites and transfer those signals to the GPS receiver 116 to identify the current location of the cell phone 114 and, hence, the location of the user carrying the cell phone 114. Instead of a built-in location identifier 2354, the cell phone 114 may be provided with a port (not shown) to receive an external location identifier (with or without the receiver antenna 2358) that may be attached to the port when needed. The GPS location identifier 2354 may perform better in an outdoor environment, e.g., when the user is on the road. In one embodiment, the user location identifier 2354 may supply the PCU 2352 with the requisite location information and the PCU 2352, with the help of the web browser module 2348 and the network interface unit 2360, may send the user location information over the Internet 18. Alternatively, the PCU 2352 may send the user's location information to the cellular service provider via the wireless network 110. As stated, the cell phone 114 may also include optional circuit elements such as a RFID reader (not shown), user database (not shown), etc.

The network interface unit 2360 provides an electrical interface for signals travelling between various circuit elements inside the cell phone 114 and a wireless carrier network, e.g., the wireless network 110 in FIG. 1. Data communication signals (including the TCP/IP messages) transmitted and/or received by the web browser module 2348 may pass through the NIU 2360 prior to reaching their appropriate destinations. The NIU 2360 may provide signal amplification in, for example, a noisy signal environment.

The network interface unit 2360 employs wireless devices to transfer data and information from the cell phone 114 over the Internet 112. An antenna, e.g., an RF (radio frequency) antenna 2366, may be provided on the cell phone 114 to allow wireless data communication. Data communication may be accomplished via a wireless modem 2362 using the wireless network 110. When the wireless network 110 is a cellular network (e.g., a TDMA-based wireless network or a CDMA-based wireless network), the wireless modem 2362 may be capable of data transfer using the message format supported by the given cellular network.

The web browser module 2348 in the cell phone 114 may be configured to transfer data over the wireless network 110 and, hence, the web browser module 2348 may be connected to the NIU 2360. The web browser module 2348 in FIG. 24 includes a WAP browser. However, a web browser module 2348 with an HTML browser may be similarly configured to perform data transmission and reception operations using wireless devices. The cell phone 114 may also include a web browser module 2348 with browser software that supports a content format that is different from HTML or WML such as, for example, the JavaScript scripting language. A cell phone may be conveniently designed to include such a web browser module for data communication.

The RF transceiver unit 2364 sends RF signals to the RF antenna 2366 for transmission to the wireless network 110 and receives RF signals from the RF antenna 2366 and forwards them to the wireless modem 2362 for further processing. The RF antenna 2366 provides the necessary signaling interface between the wireless network 110 and the web browser module 2348 that needs to access the wireless network 110.

The wireless modem 2362 may perform necessary data encoding for the data received from the WAP browser in the web browser module 2348 to prepare the data (e.g., a query message) to be sent to the wireless network 110 and eventually over the Internet 112. A corresponding decoding may be performed by the wireless modem 2362 upon receipt of data from the RF transceiver unit 2364 prior to sending the decoded data to the WAP browser (in the web browser module 2348) for further processing. The RF transceiver unit 2364 modulates data received from the wireless modem 2362 to be transmitted over an RF transmission channel linking the cell phone 114 with the wireless network 110. This modulated data is then wirelessly transmitted to the wireless network 110 (and, hence, to the Internet 112) by the RF antenna unit 2366. Upon reception of any data or information from the wireless network 110 (e.g., an e-mail message received over the Internet), the RF antenna unit 2366 forwards the RF-modulated data to the RF transceiver unit 2364, which demodulates the data and sends it to the wireless modem 2362 for further processing and transfer to the WAP browser in the web browser module 2348.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. Please note that the aforementioned examples are not meant to be limiting. Additional embodiments of systems and methods are also contemplated that may include many of the above-described features. Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

The following documents may also elaborate on aspects of the present disclosure and are incorporated by reference in their entirety: U.S. Pat. No. 6,675,017, entitled "Location blocking service for wireless networks", to Samuel N. Zellner, Mark J. Enzmann, and Robert T. Moton, Jr; U.S. Pat. No. 6,716,101, entitled "System and method for monitoring the location of individuals via the world wide web using a wireless communications network", to Vernon Meadows and Michael S. Harper; U.S. Pat. No. 6,738,808, entitled "Anonymous location service for wireless networks", to Samuel N. Zellner, Mark J. Enzmann, and Robert T. Moton, Jr.; U.S. Pat. No. 6,799,049, entitled "System and method for tracking movement of a wireless device", to Samuel N. Zellner, Mark J. Enzmann, and Robert T. Moton, Jr.; US Published App. No. 2002/0077083, entitled "Identity blocking service from a wireless service provider", of Samuel N. Zellner, Mark J. Enzmann, and Robert T. Moton, Jr.; US Published App. No. 2002/0077118, entitled "Location blocking service from a wireless service provider", of Samuel N. Zellner, Mark J. Enzmann, and Moton, Robert T. Moton, Jr.; US Published App. No. 2004/0205198, entitled "Anonymous location service for wireless networks", of Samuel N. Zellner, Mark J. Enzmann, and Robert T. Moton, Jr.; US Published App. No. 2006/0030335, entitled "Identity blocking service from a wireless service provider", of Samuel N. Zellner, Mark J. Enzmann, and Robert T. Moton, Jr.; US Published App. No. 2006/0089134, entitled "System and method for using location information to execute an action", of Robert T. Moton, Jr., Mark J. Enzmann, and Samuel N. Zellner.; US Published App. No. 2006/0094447, entitled "System and method for using location information to execute an action", of Samuel N. Zellner.; US Published App. No. 2004/0097243, entitled "Location blocking service for wireless networks", of Samuel N. Zellner, Mark J. Enzmann, and Robert T. Moton, Jr.; US Published App. No. 2006/0099966, entitled "System and method for using location information to execute an action", of Robert T. Moton, Jr., Mark J. Enzmann, and Samuel N. Zellner; "Location-Based Services" by Jochen Schiller and Agnes Voisard, which was published in 2004 and has ISBN No.:1558609296; "E-Commerce: Business, Technology, Society", Second Edition, by Kenneth C. Laudon and Carol Guercio Traver, which was published in 2004 and has ISBN No.: 0321269373; and "WWW.Advertising: Advertising and Marketing on the World Wide Web" by Richard Adams, which was published in 2003 and has ISBN No.: 0823058611.

Embodiments of the present disclosure can be implemented in hardware, software, firmware, or a combination thereof. In various embodiment(s), system components are implemented in software or firmware that is stored in a memory and that is executed by a suitable instruction execution system. If implemented in hardware, as in some embodiments, system components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Software components may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of one or more embodiments in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present disclosure.

Therefore, having thus described the invention, at least the following is claimed:

1. A method comprising:
   determining a current location of a mobile device;
   analyzing, via a computer, a location history for previous activities at the current location, the location history comprising:
      tracked locations that were tracked over a period of time; and
      a duration of time spent at each tracked location of the tracked locations;
   determining, by analyzing the location history via the computer, that a sellable item is an item of interest based on:
      a frequency of visits by the mobile device at the current location;
      time spent in a first area of an establishment corresponding to the current location;
      the sellable item being visited at two different tracked locations;
      a first duration of time spent at a first location of the two different tracked locations being longer than a second duration of time spent at a second location of the two different tracked locations; and
      the first duration occurring more recently than the second duration; and
   sending, via the computer, an electronic message about the item of interest.

2. The method of claim 1, wherein the current location corresponds to a retail store.

3. The method of claim 1, wherein the sellable item is further determined to be an item of interest based on time spent in a second area of the establishment.

4. The method of claim 1, wherein the sellable item is further determined to be an item of interest based on demographics of a user of the mobile device.

5. The method of claim 1 wherein the sellable item is further determined to be an item of interest based on activities of a user of the mobile device in the first area.

6. The method of claim 1, wherein the electronic message comprises an advertisement.

7. The method of claim 6, wherein the electronic message comprises at least one of a coupon or directions.

8. The method of claim 7, wherein the electronic message is delivered to the mobile device.

9. The method of claim 1, wherein the location history comprises multiple locations that are analyzed corresponding to locations categorized as being similar to one another.

10. The method of claim 1, wherein the location history comprises specific locations in a store and further includes a time period beyond one day.

11. A computer readable storage medium that is not a propagating signal, the computer readable storage medium comprising executable instructions that when executed by a processor cause the processor to effectuate operations comprising:
    determining a current location of a mobile device;
    analyzing a location history for previous activities at the current location, the location history comprising:
       tracked locations that were tracked over a period of time; and
       a duration of time spent at each tracked location of the tracked locations;
    determining, by analyzing the location history that a sellable item is an item of interest based on:
       a frequency of visits by the mobile device at the current location;
       time spent in a first area of an establishment corresponding to the current location;
       the sellable item being visited at two different tracked locations;
       a first duration of time spent at a first location of the two different tracked locations being longer than a second duration of time spent at a second location of the two different tracked locations; and
       the first duration occurring more recently than the second duration; and
    sending an electronic message about the item of interest.

12. The computer readable storage medium of claim 11, wherein the sellable item is further determined to be an item of interest based on time spent in a first area of an establishment corresponding to the current location.

13. The computer readable storage medium of claim 12, wherein the sellable item is further determined to be an item of interest based on time spent in a second area of the establishment.

14. The computer readable storage medium of claim 11, wherein the location history comprises multiple locations that are analyzed corresponding to locations categorized as being similar to one another.

15. A server comprising:
    a processor; and
    memory coupled to the processor, the memory comprising executable instructions that when executed by the processor cause the processor to effectuate operations comprising:
       determining a current location of a mobile device;
       analyzing a location history for previous activities at the current location, the location history comprising:
          tracked locations that were tracked over a period of time; and
          a duration of time spent at each tracked location of the tracked locations;
       determining, by analyzing the location history, that a sellable item is an item of interest based on:
          a frequency of visits by the mobile device at the current location;
          time spent in a first area of an establishment corresponding to the current location;
          the sellable item being visited at two different tracked locations;
          a first duration of time spent at a first location of the two different tracked locations being longer than a second duration of time spent at a second location of the two different tracked locations; and
          the first duration occurring more recently than the second duration; and
       sending an electronic message about the item of interest.

16. The server of claim 15, the operations further comprising:
    receiving an indication of a first area of a current location of a mobile device, the first area identified by detection of a signal emitted from a radio-frequency identification tag.

17. The server of claim 16, wherein the indication of user interest is further determined based on time spent in the first area of an establishment corresponding to the current location.

* * * * *